US010673798B2

(12) United States Patent
Shan et al.

(10) Patent No.: US 10,673,798 B2
(45) Date of Patent: *Jun. 2, 2020

(54) METHOD AND SYSTEM FOR PROVIDING NOTIFICATIONS FOR GROUP MESSAGES

(71) Applicant: Tencent Technology (Shenzhen) Company Limited, Shenzhen (CN)

(72) Inventors: Yi Shan, Shenzhen (CN); Baihan Cai, Shenzhen (CN)

(73) Assignee: Tencent Technology (Shenzhen) Company Limited, Shenzhen, Guangdong Province (CN)

(*) Notice: Subject to any disclaimer, the term of this patent is extended or adjusted under 35 U.S.C. 154(b) by 127 days.

This patent is subject to a terminal disclaimer.

(21) Appl. No.: 15/986,695

(22) Filed: May 22, 2018

(65) Prior Publication Data

US 2018/0270181 A1    Sep. 20, 2018

Related U.S. Application Data

(63) Continuation of application No. 15/213,053, filed on Jul. 18, 2016, now Pat. No. 10,021,058, which is a
(Continued)

(30) Foreign Application Priority Data

Jan. 24, 2014   (CN) .......................... 2014 1 0036537

(51) Int. Cl.
G06F 15/16    (2006.01)
H04L 12/58    (2006.01)
(Continued)

(52) U.S. Cl.
CPC ............. *H04L 51/24* (2013.01); *H04L 51/04* (2013.01); *H04L 51/14* (2013.01); *H04L 51/32* (2013.01);
(Continued)

(58) Field of Classification Search
CPC ....... H04L 51/04; H04L 51/063; H04L 51/12; H04L 51/14; H04L 51/24; H04L 51/32; H04L 65/4076; H04L 67/10
(Continued)

(56) References Cited

U.S. PATENT DOCUMENTS 6,161,021 A * 12/2000 Akpa ................. H04W 88/022
                                                    455/512
8,626,863 B2 * 1/2014 Huang ................ H04L 12/1827
                                                    709/206
(Continued)

FOREIGN PATENT DOCUMENTS

CN        1878072 A      12/2006
CN        1941748 A       4/2007
(Continued)

OTHER PUBLICATIONS

Tencent Technology, ISRWO, PCT/CN2015/070324, Apr. 24, 2015, 9 pgs.
(Continued)

*Primary Examiner* — Liang Che A Wang
(74) *Attorney, Agent, or Firm* — Morgan, Lewis & Bockius LLP

(57) ABSTRACT

A server receives a group message from a first user account in a social networking platform, the group message to be sent to a plurality of user accounts, and determines whether the group message refers to one or more user accounts of the plurality of user accounts. For a respective user account referred to by the group message, the server sends a notification to a terminal associated with the respective user account, wherein the notification is rendered at the terminal in a first manner configured by the respective user account. For a respective user account not referred to by the group message, the server sends a notification to a terminal associated with the respective user account, wherein the notifi-
(Continued)

cation is rendered at the terminal in a second manner configured by the social networking platform, wherein the second manner is different from the first manner.

20 Claims, 15 Drawing Sheets

Related U.S. Application Data continuation of application No. PCT/CN2015/070324, filed on Jan. 8, 2015.

(51) Int. Cl.
  *H04L 29/06* (2006.01)
  *H04L 29/08* (2006.01)
(52) U.S. Cl.
  CPC .......... *H04L 65/4076* (2013.01); *H04L 67/10* (2013.01); *H04L 51/063* (2013.01); *H04L 51/12* (2013.01)
(58) Field of Classification Search
  USPC ........................................ 709/204, 205, 206
  See application file for complete search history.

(56) References Cited

U.S. PATENT DOCUMENTS

| | | | | |
|---|---|---|---|---|
| 8,862,676 | B1* | 10/2014 | Bilinski | H04L 67/26 709/200 |
| 9,143,468 | B1* | 9/2015 | Cohen | H04L 51/32 |
| 2009/0059922 | A1 | 3/2009 | Appelman et al. | |
| 2010/0064015 | A1* | 3/2010 | Sacks | G06Q 10/10 709/206 |
| 2010/0125580 | A1* | 5/2010 | Westen | G06F 16/24575 707/737 |
| 2013/0013700 | A1* | 1/2013 | Sittig | G06Q 10/10 709/206 |
| 2014/0181197 | A1* | 6/2014 | Baggott | H04L 65/403 709/204 |
| 2014/0184452 | A1* | 7/2014 | Hekkala | H01Q 1/243 343/702 |
| 2014/0184471 | A1* | 7/2014 | Martynov | G06F 3/1423 345/1.2 |
| 2014/0310046 | A1* | 10/2014 | Shidfar | G06Q 10/1095 705/7.19 |
| 2016/0170991 | A1* | 6/2016 | Birchall | G06F 16/24578 707/751 |
| 2016/0205192 | A1* | 7/2016 | Hisamatsu | G06F 13/385 709/217 |
| 2017/0325171 | A1* | 11/2017 | Xu | H04W 4/12 |

FOREIGN PATENT DOCUMENTS

| | | |
|---|---|---|
| CN | 101039284 A | 9/2007 |
| CN | 101784020 A | 7/2010 |
| CN | 102932238 A | 2/2013 |
| CN | 103259714 A | 8/2013 |
| CN | 104144110 A | 11/2014 |
| WO | WO 2008091636 A1 | 7/2008 |

OTHER PUBLICATIONS

Tencent Technology, IPRP, PCT/CN2015/070324, Jul. 26, 2016, 7 pgs.

* cited by examiner

918 — After sending the notification to the respective user account, obtain at least one subsequent group message from the group of user accounts in the social networking platform that refers to the user corresponding to the respective user account; and In response to obtaining the at least one subsequent groupmessage, send an updated notification to the respective user account indicating a current count of times that the user has been referred to in group messages sent among the group of user accounts in the social networking platform 920 — After sending the notification to the respective user account, obtain at least one subsequent group message from the group of user accounts in the social networking platform; and In response to obtaining the at least one subsequent group message, send an updated notification to the respective user account indicating a count of group messages sent by the group of user accounts in the social networking platform since the group message was sent by the first user account that referred to the user corresponding to the respective user account 922 — The notification is a generic notification that does not include content of the group message.

Receive an input from the respective user to display the content of the group message; and In response to receiving the input, send a detailed notification to the respective user account that includes the content of the group message 924 — After sending the notification to the respective user account, provide a status indicator to the first user account indicating a presentation status of the notification with respect to the respective user account

METHOD AND SYSTEM FOR PROVIDING NOTIFICATIONS FOR GROUP MESSAGES

PRIORITY CLAIM AND RELATED APPLICATION

This application is a continuation application of U.S. patent application Ser. No. 15/213,053, entitled "METHOD AND SYSTEM FOR PROVIDING NOTIFICATIONS FOR GROUP MESSAGES" filed on Jul. 18, 2016, which is a continuation application of PCT Patent Application No. PCT/CN2015/070324, entitled "METHOD AND SYSTEM FOR PROVIDING NOTIFICATIONS FOR GROUP MESSAGES" filed on Jan. 8, 2015, which claims priority to Chinese Patent Application No. 201410036537.3, entitled "METHOD AND SYSTEM FOR PUSHING MESSAGES," filed on Jan. 24, 2014, all of which are incorporated by reference in their entirety.

FIELD OF THE TECHNOLOGY

The present disclosure relates to the field of Internet technologies, and in particular, to a method and system for providing notifications to users for group messages.

BACKGROUND OF THE TECHNOLOGY

The development of Internet technologies along with instant messaging tools and social networks make communication between people extremely convenient. A group communication function of the instant messaging tools and social networks implement communication between multiple users. So as to ensure that a message posted by a user of the group communication function reaches the other users in the group in a timely manner, a notification related to the posted message may be pushed in real time to terminals of other users in the group. However, such push notifications may result in sudden large influx of notifications and possibly disturb users in the group. A user may select to block group message notifications to avoid receiving notifications.

SUMMARY

As discussed in the background, a user may select to block group message notifications to avoid receiving notifications. However, if the user selects to block group message notifications, timely viewing and delivery of group messages is no longer ensured. Additionally, with conventional technologies, message content is typically pushed directly to a terminal and is displayed directly by the terminal along with the notification, which may result in a risk of information leakage and/or a security threat. The solutions disclosed herein may address the above deficiencies of the present technology.

In some embodiments, a method of providing notifications to users for group messages transmitted over a social networking platform is performed at a server (e.g., server system 108, FIGS. 1-2) with one or more processors and memory. The method includes obtaining a group message from a first user account in the social networking platform, where the group message is to be sent to a group of user accounts in the social networking platform. For a respective user account in the group of user accounts, the method includes: determining a status of a group message notification function of the social networking platform for the respective user account; in accordance with a determination that the status of the group message notification function indicates that the respective user account has disabled the group message notification function, determining whether a user corresponding to the respective user account is referred to in the group message; and, in accordance with a determination that the user is referred to in the group message, sending a notification to the respective user account regarding the group message referring to the user, despite of the disabled status for the group message notification function.

In some embodiments, a computing device (e.g., server system 108, FIGS. 1-2; client device 104, FIGS. 1 and 3; or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computing device (e.g., server system 108, FIGS. 1-2; client device 104, FIGS. 1 and 3; or a combination thereof) with one or more processors, cause the computing device to perform, or control performance of, the operations of any of the methods described herein. In some embodiments, a computing device (e.g., server system 108, FIGS. 1-2; client device 104, FIGS. 1 and 3; or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 9A-9C illustrate a flowchart diagram of a method of providing notifications to users for group messages transmitted over a social networking platform in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
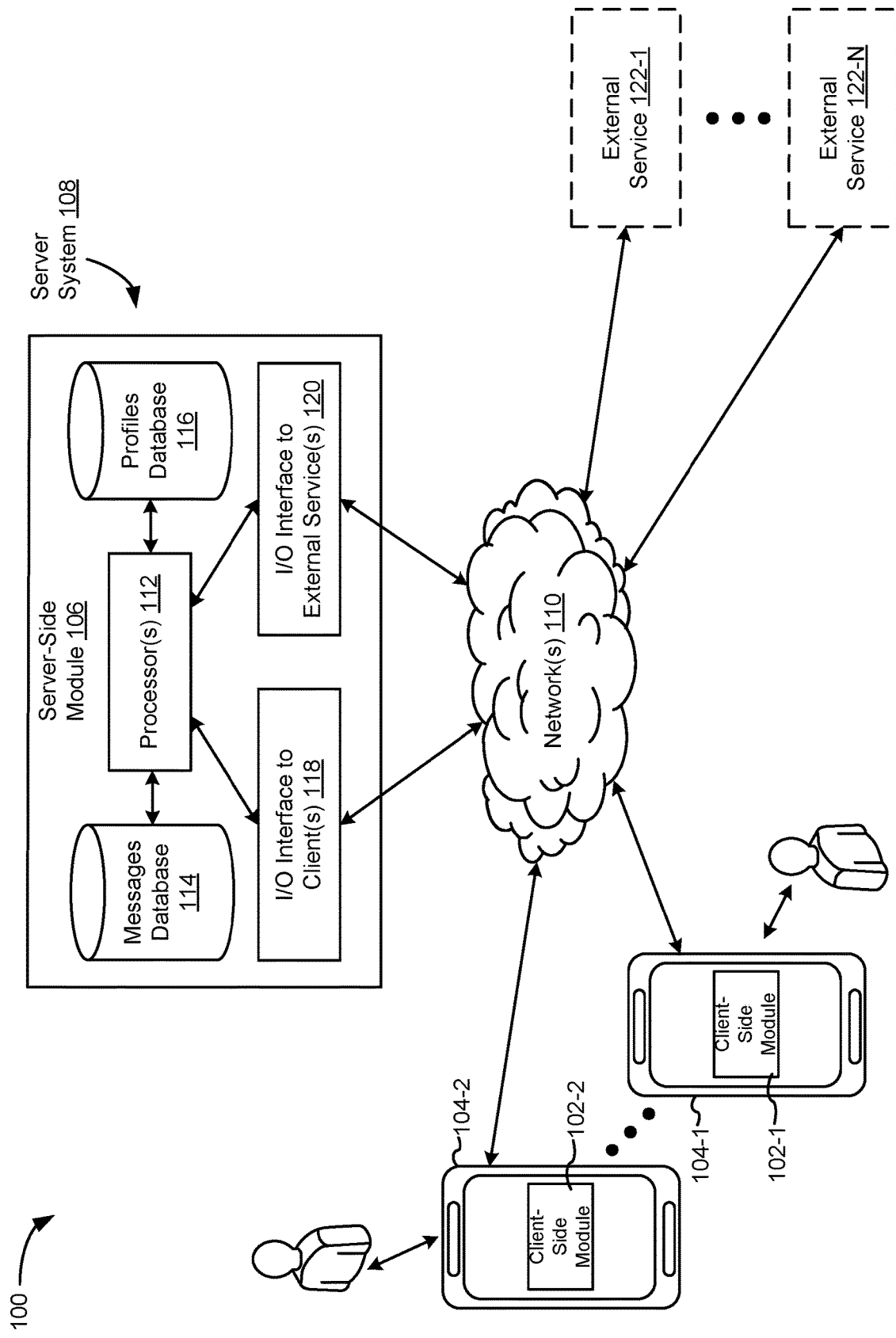
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side modules 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform and communications with server-side module 106. Server-side module 106 provides server-side functionalities for the social networking platform for any number of client modules 102 each residing on a respective client device 104.

In some embodiments, server-side module 106 includes one or more processors 112, messages database 114, profiles database 116, an I/O interface to one or more clients 118, and an I/O interface to one or more external services 120. I/O interface to one or more clients 118 facilitates the client-facing input and output processing for server-side module 106. In some embodiments, processor(s) 112 send special notifications to user(s) subscribed to a group chat that are mentioned in a group message. Messages database 114 stores messages sent by users in the social networking platform, and profiles database 116 stores user profiles for users of the social networking platform. I/O interface to one or more external services 120 facilitates communications with one or more external services 122 (e.g., web servers or cloud-based service providers such as video and/or image hosting and storage websites).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point of sale (POS) terminal, vehicle-mounted computer, an ebook reader, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108. In some embodiments, server system 108 includes, but is not limited to, a handheld computer, a tablet computer, a laptop computer, a desktop computer, or a combination of any two or more of these data processing devices or other data processing devices.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client-server environment 100 can vary in different embodiments. For example, in some embodiments, client-side module 102 is a thin-client that provides only user-facing input and output processing functions, and delegates all other data processing functionalities to a backend server (e.g., server system 108). Although many aspects of the present technology are described from the perspective of the server, the corresponding actions performed by the client device would be apparent to ones skilled in the art without any creative efforts. Furthermore, some aspects of the present technology may be performed by the server, the client device, or the server and the client cooperatively.

Figure 2:
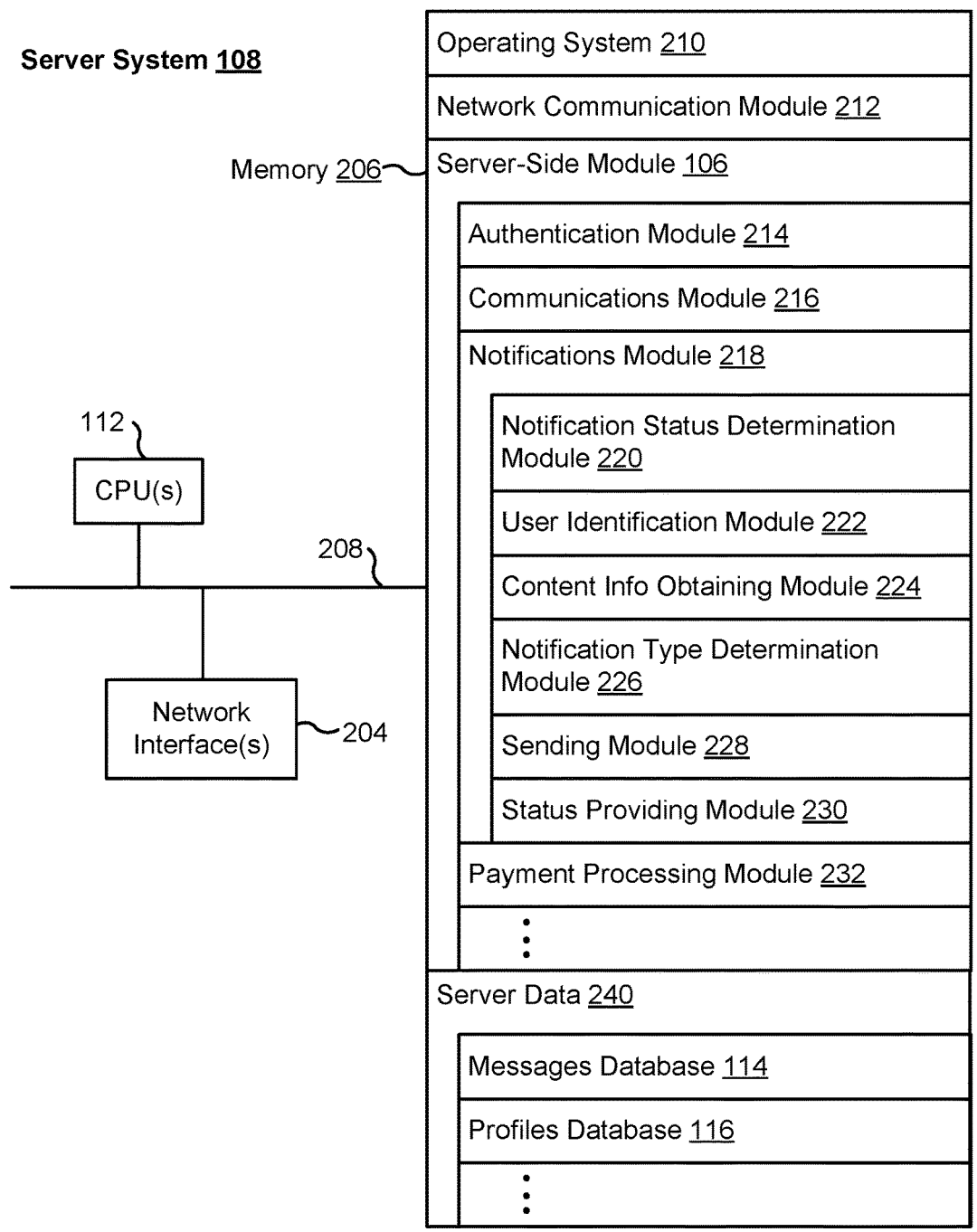
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);
- server-side module 106, which provides server-side data processing and functionalities for the recording application, including but not limited to:
  - authentication module 214 for authenticating users associated with client devices 104 to use the social networking platform;
  - communications module 216 for managing and routing messages sent between users of the social networking platform;
  - notifications module 218 sending notifications regarding messaging activity in a group messaging feature of the social networking platform (e.g., a group chat), including but not limited to:
    - notification status determination module 220 for determining the status of a group message notification function for a user subscribing to a group chat of the social networking platform in response to obtaining a group message sent to the users subscribed to the group chat;
    - user identification module 222 for identifying one or more users mentioned in a message sent via in the group messaging feature;
    - context information obtaining module 224 for obtaining the notification privacy setting for the one or more users identified by the user identification module 222 and/or one or more environmental conditions for the one or more users identified by the user identification module 222;
    - notification type determination module 226 for determining a type of notification (i.e., generic or detailed) to send to the one or more users identified by the user identification module 222 based on the predetermined privacy setting and/or the one or more environmental conditions for the one or more identified users obtained by context information obtaining module 224;
    - sending module 228 for sending the type of notification determined by notification type determination module 226 to the one or more users identified by the user identification module 222; and
    - status providing module 230 for providing a status indicator to the first user account (i.e., the sender of the group message) indicating a presentation status of the notification corresponding to the group message (e.g., read, delivered, or notified); and
  - (optionally) payment processing module 232 for processing transactions for a respective user of the social networking platform based on payment data in a user profile in profiles database 116 corresponding to the respective user; and
- server data 240 storing data for the software testing application, including but not limited to:
  - messages database 114 storing messages sent by users in the social networking platform; and
  - profiles database 116 storing user profiles for users of the social networking platform, where a respective user profile for a user includes a user identifier (e.g., an account name or handle), login credentials to the social networking platform, (optionally) payment data (e.g., linked credit card information, app credit or gift card balance, billing address, shipping address, etc.), an IP address or preferred contact information, status of a group message notification function, a notification privacy setting, environmental condition(s), group chat(s) subscribed to, contacts list, custom parameters for the user (e.g., age, location, hobbies, etc.), and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
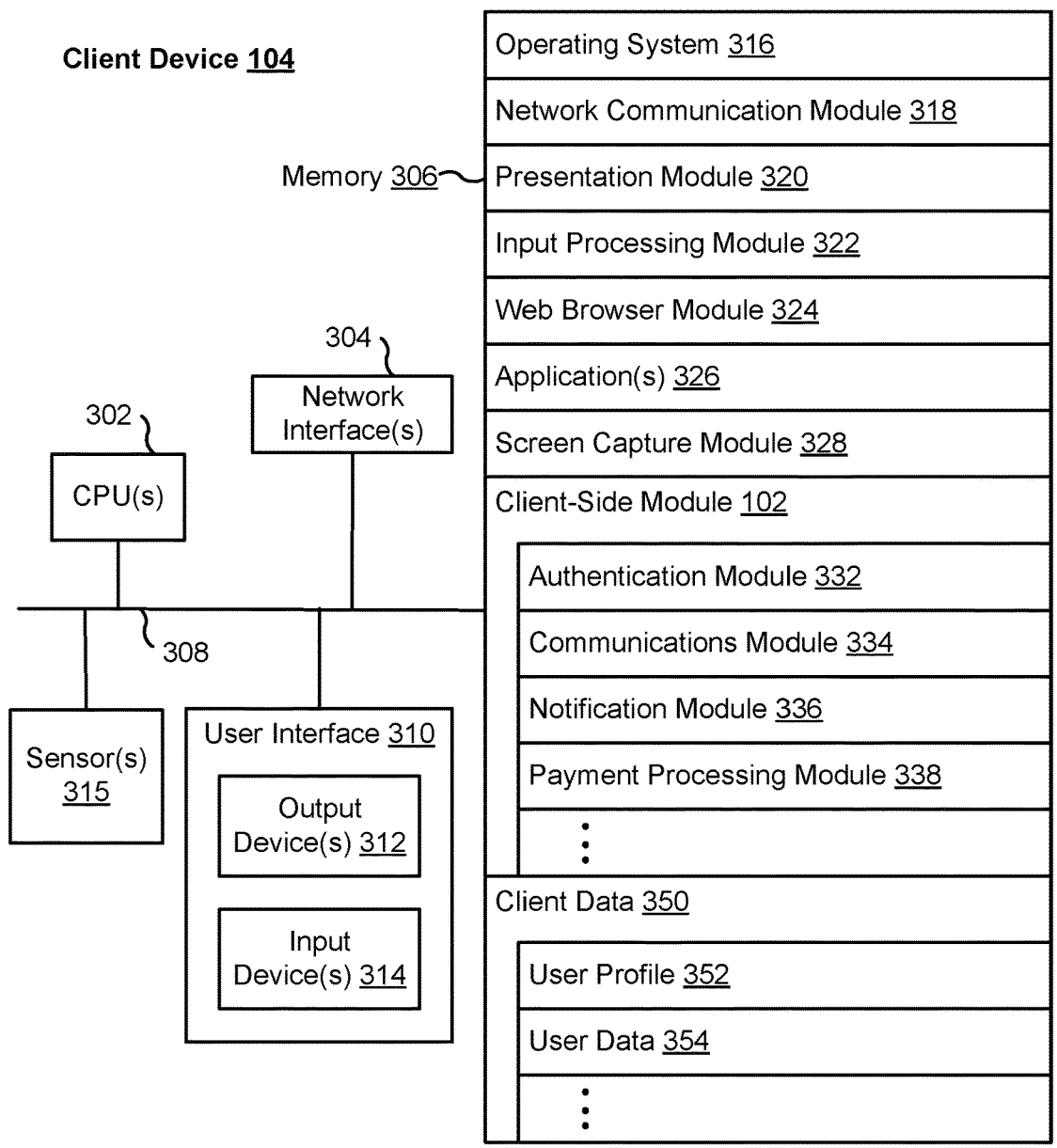
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a gesture capturing camera, or other input buttons or controls. Furthermore, some client devices 104 use a microphone and voice recognition or a camera and gesture recognition to supplement or replace the keyboard. In some embodiments, client device 104 further includes sensors 315, which provide context information as to the current state of client device 104 or the environmental conditions associated with client device 104. Sensors 315 include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 104 to other computing devices (e.g., server system 108 and external service(s) 122) connected to one or more networks 110 via one or more network interfaces 304 (wired or wireless);
- presentation module 320 for enabling presentation of information (e.g., a user interface for application(s) 326 or the social networking platform, widgets, websites and web pages thereof, and/or games, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326 for execution by client device 104 (e.g., games, application marketplaces, payment platforms, and/or other web or non-web based applications);
- client-side module 102, which provides client-side data processing and functionalities for the social networking platform, including but not limited to:
  - authentication module 332 for authenticating the user of client device 104 to access his/her account in the social networking platform;
  - communications module 334 for sending messages to and receiving messages from other users of the social networking platform (e.g., instant messaging, group chat, message board, message/news feed, and the like);
  - notification module 336 for displaying a notification regarding messaging activity in a group messaging feature of the social networking platform (e.g., a group chat); and
  - (optionally) payment processing 338 for processing payments associated with transactions initiated within the social networking platform or at a merchant's website within web browser module 324; and
- client data 350 storing data associated with the social networking platform, including, but is not limited to:
  - user profile 352 storing a user profile associated with the user of client device 104 for the social networking platform, including a user identifier (e.g., an account name or handle), login credentials to the social networking platform, (optionally) payment data (e.g., linked credit card information, app credit or gift card balance, billing address, shipping address, etc.), an IP address or preferred contact information, status of a group message notification function, a notification privacy setting, environmental condition(s), group chat(s) subscribed to, contacts list, custom parameters for the user (e.g., age, location, hobbies, etc.), and identified trends and/or likes/dislikes of the user; and
  - user data 354 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Attention is now directed towards embodiments of user interfaces and associated processes that may be implemented on a client device 104 with a touch screen (sometimes also herein called a "touch screen display") enabled to receive one or more touch inputs and display information (e.g., media content, websites and web pages thereof, and/or user interfaces for an application such as a web browser and the first and second social networking platform applications). FIGS. 4A-4H illustrate exemplary user interfaces for providing notifications to users for group messages transmitted over a social networking platform in accordance with some embodiments.

Figure 4C:
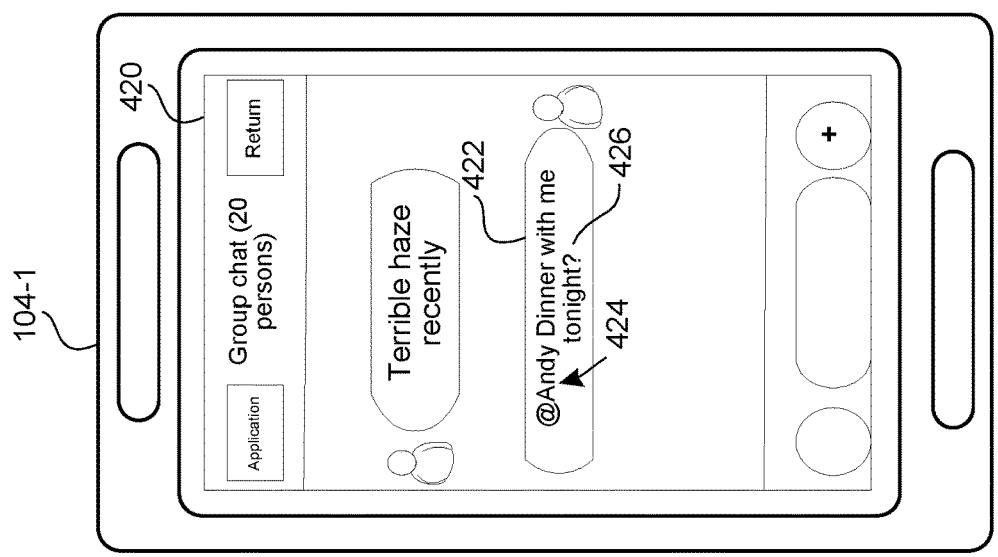
FIGS. 4A-4H illustrate exemplary user interfaces for providing notifications to users for group messages transmitted over a social networking platform in accordance with some embodiments.
Figure 4B:
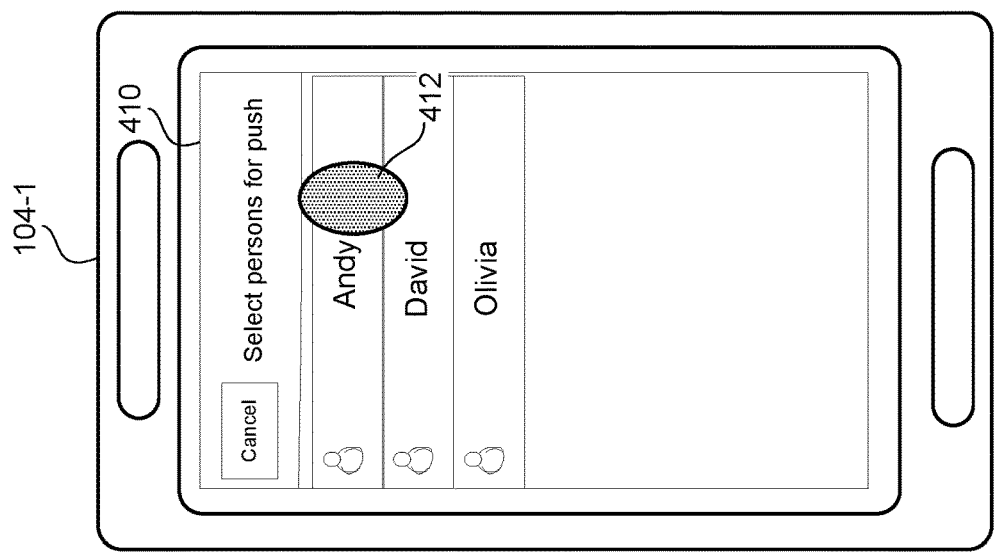
Figure 4A:
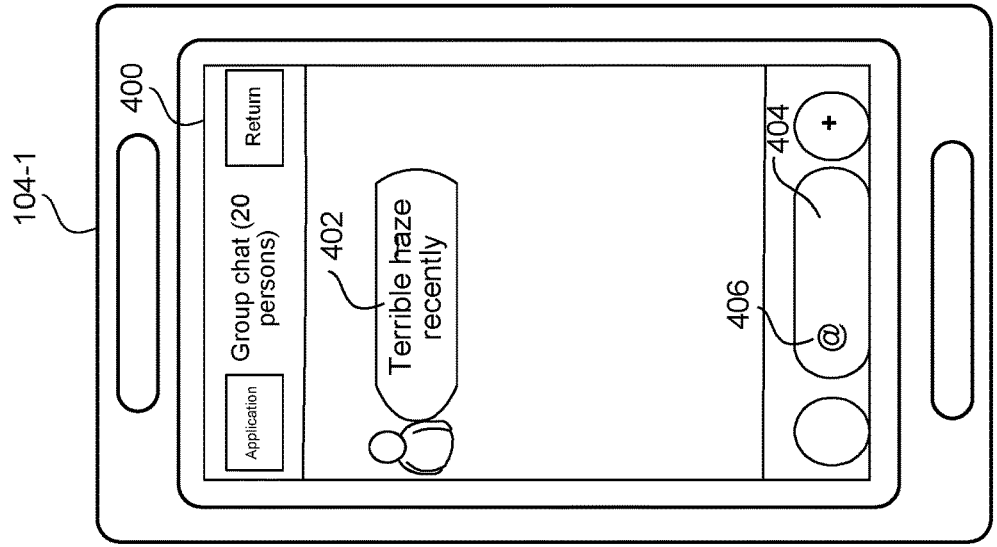

FIGS. 4A-4C show a user interface displayed on a first client device 104-1 (e.g., a mobile phone) executing the social networking platform (e.g., client-side module 102, FIGS. 1 and 3) that is associated with a first user; however, one skilled in the art will appreciate that the user interfaces shown in FIGS. 4A-4C may be implemented on other similar computing devices. FIGS. 4D-4H show a user interface displayed on a second client device 104-2 (e.g., a mobile phone) executing the social networking platform (e.g., client-side module 102, FIGS. 1 and 3) that is associated with a second user; however, one skilled in the art will appreciate that the user interfaces shown in FIGS. 4D-4H may be implemented on other similar computing devices. The user interfaces in FIGS. 4A-4H are used to illustrate the methods described in FIGS. 5, 7-8, and 9A-9C.

FIG. 4A illustrates first client device 104-1 displaying an interface 400 for a chat group that includes 20 persons. For example, the chat group is a group chat messaging feature of the social networking platform provided by server system 108. In FIG. 4A, interface 400 includes message 402 from a user in the social networking platform that is subscribed to the group chat. In FIG. 4A, interface 400 also includes text entry box 404 for entering a message to the users in the social networking platform that are subscribed to the group chat via a virtual keyboard or aurally. In FIG. 4A, the first user of first client device 104-1 has entered character 406 (i.e., an "@" symbol).

FIG. 4B illustrates first client device 104-1 displaying interface 410 for the chat group in response to detecting input of the "@" symbol in text entry box 404 in FIG. 4A. In FIG. 4B, interface 410 enables the first user of first client device 104-1 to select one or more target recipients from the list of users subscribed to the group chat (e.g., with a touch input or stylus selection). FIG. 4B also illustrates first client device 104-1 detecting contact 412 at a location corresponding to "Andy," a respective user in the social networking platform that is subscribed to the group chat. For example, after selecting one or more target recipients, the first user of first client device 104-1 is able to enter a group message targeted to the one or more selected target recipients via a virtual keyboard or aurally. In some embodiments, the group message would be visible to all users participating in the group chat, but special notification would be pushed to the selected users irrespective whether those users have generally disabled the group message notification function on their individual devices. In some embodiments, the user does not need to select the users to push the group message notification via the user interface 410 shown in FIG. 4B, instead, the user can directly type in those users' aliases after the special indicator (e.g., @) in the text input box 404 shown in FIG. 4A.

FIG. 4C illustrates first client device 104-1 displaying interface 420 for the chat group after detecting contact 412 in FIG. 4B. In FIG. 4C, interface 420 includes message 422 in response to selection of "Andy" in FIG. 4B and entrance of text for a group message by the first user of first client device 104-1 (e.g., "Dinner with me tonight?"). In FIG. 4C, message 422 includes a tag 424 mentioning the target recipient for the group message (e.g., the "@" symbol followed by "Andy") and content 426 of the group message (e.g., "Dinner with me tonight?").

In some embodiments, the aliases of the users selected to receive the push notification does not need to appear in the group message itself. For example, the user may enter the special indicator @ in the text input box 404 to bring up the list of people in the group chat, and after the user has selected one or more of those people as the recipients for the special notification, the message is sent to all users in the group chat without explicitly containing the aliases of the selected users and/or the special indicator, and special notification is sent to the selected people about the group message irrespective of the disabled status of the group notification function for the selected people. In other words, the server is aware which users are referred to specially by the sender of the message, and the server performs the special notification method described herein, but the message appears to the rest of the group just like any other group message that does not specially refer to anyone either explicitly in the text of the message or implicitly through a selection interface such as that shown in FIG. 4B.

Figure 4E:
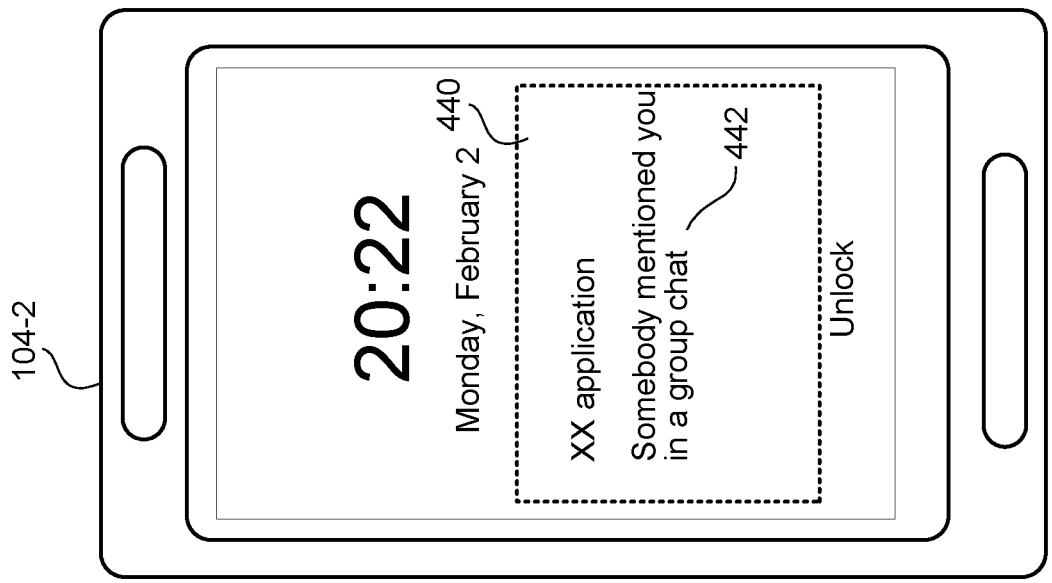
Figure 4D:
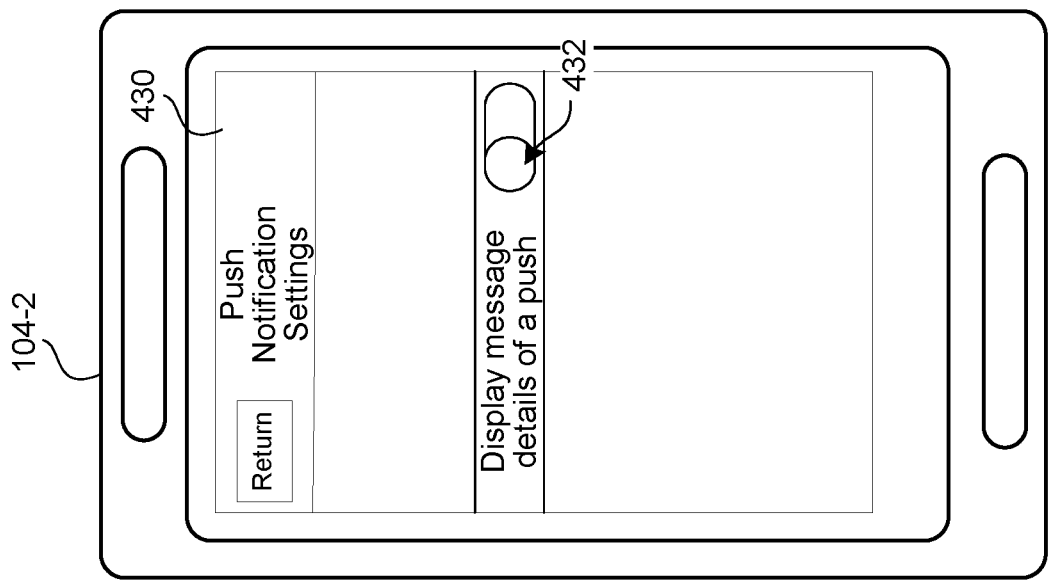

FIG. 4D illustrates second client device 104-2 displaying a settings interface 430 for the social networking platform. In FIG. 4D, settings interface 430 includes toggle/slider 432 for enabling or disabling detailed push notifications when the second user is mentioned in a group message in the group chat. Generally, when the status of the group notification function is disabled, the user does not receive notifications for the messages sent during the group chat.

FIG. 4E illustrates second client device 104-2 displaying a notification 440 on the lock screen of second client device 104-2. In FIG. 4E, notification 440 is a generic notification that only indicates the application related to notification 440 (e.g., XX application or the social networking platform) and an indication 442 that someone mentioned the second user of second client device 104-2 in the group chat.

Figure 4H:
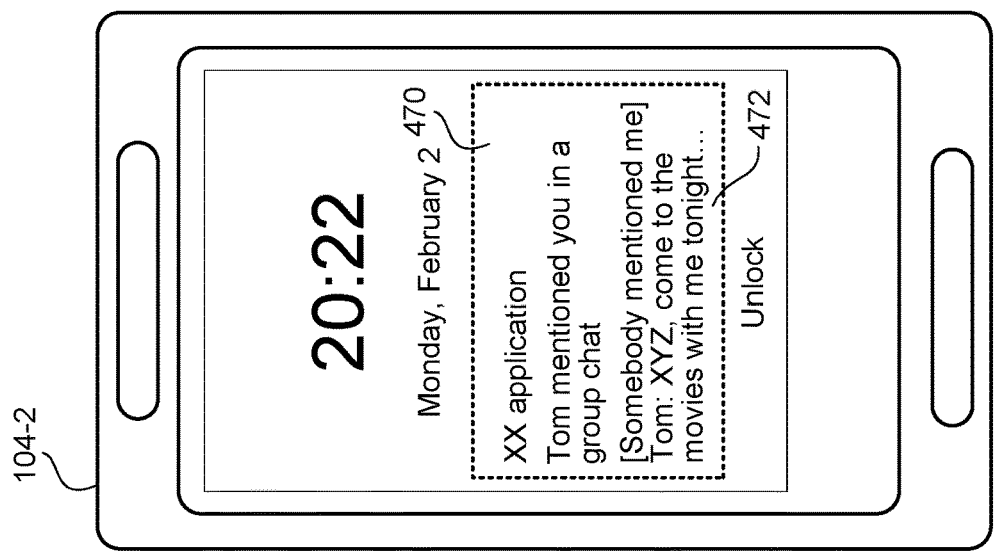
Figure 4G:
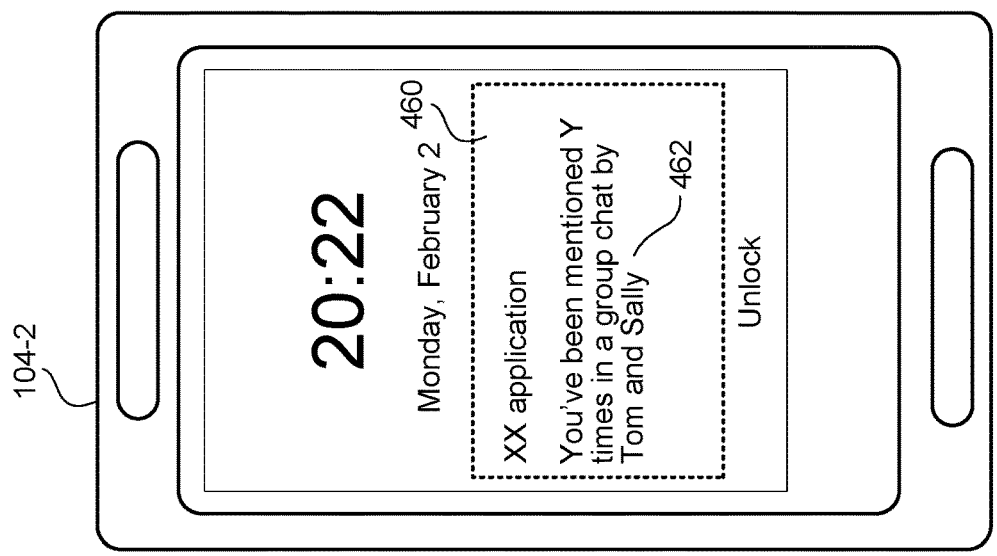
Figure 4F:
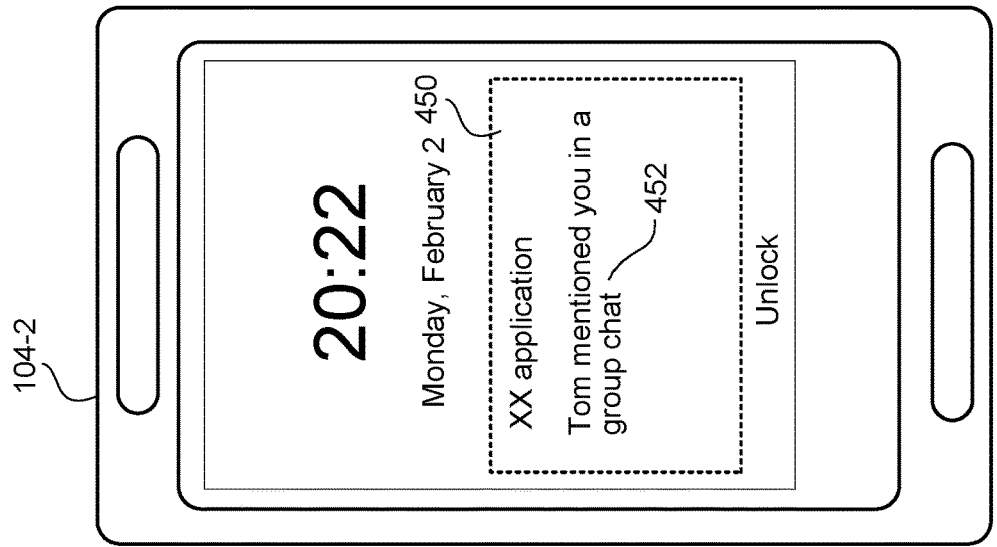

FIG. 4F illustrates second client device 104-2 displaying a notification 450 on the lock screen of second client device 104-2. In FIG. 4F, notification 450 is a detailed notification that indicates the application related to notification 450 (e.g., XX application or the social networking platform) and an indication 452 that "Tom" mentioned the second user of second client device 104-2 in the group chat.

FIG. 4G illustrates second client device 104-2 displaying a notification 460 on the lock screen of second client device 104-2. In FIG. 4G, notification 460 is a detailed notification that is a dynamically updated version of detailed notification 450 in FIG. 4F. In FIG. 4G, notification 460 includes an indication 462 of the number of times (i.e., Y times) that the second user of second client device 104-2 was mentioned in the group and the users in the group chat that mentioned the second user of second client device 104-2 (i.e., "Tom" and "Sally").

FIG. 4H illustrates second client device 104-2 displaying a notification 470 on the lock screen of second client device 104-2. In FIG. 4H, notification 470 is a detailed notification that indicates the application related to notification 470 (e.g., XX application or the social networking platform) and an indication 452 that "Tom" mentioned the second user of second client device 104-2 in the group chat and the content of the group message in which "Tom" mentioned the second user of second client device 104-2 (e.g., "XYZ, come to the movies with me tonight . . . ").

In some embodiments, the client device provides various user controls in a settings interface to specify which information (e.g., sender name, number of mentions, what social platform, what chat group, full content of the message, partial content of the message, summary of the message, etc.) should be included in the notification and/or under what conditions certain information should or should not be included in the notifications.

Figure 5:
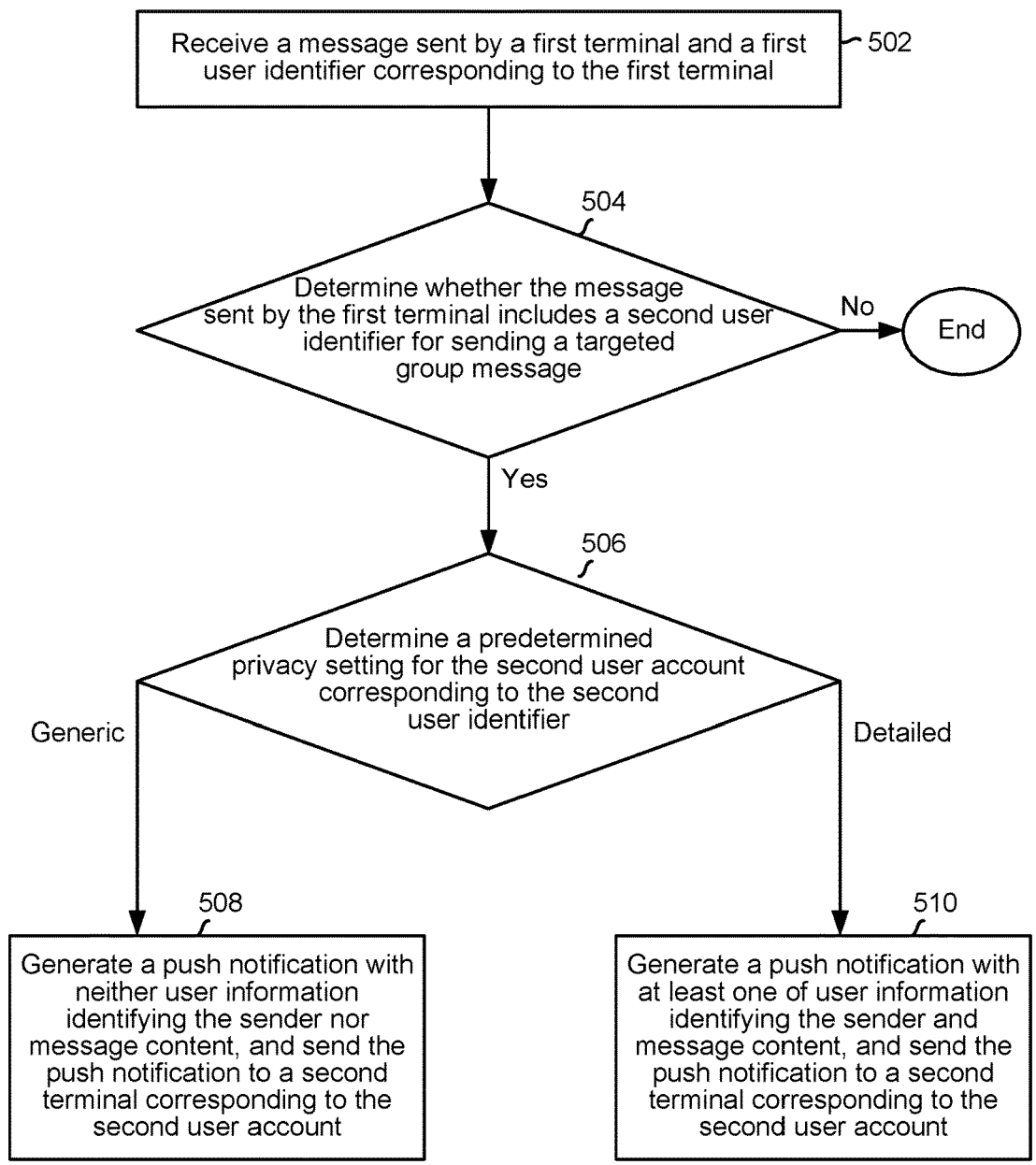
FIG. 5 illustrate a flowchart diagram of a method of providing notifications to users for group messages in accordance with some embodiments.

FIG. 5 illustrates a flowchart diagram of a method 500 of providing notifications to users for group messages in accordance with some embodiments. In some embodiments, method 500 is performed by a server with one or more processors and memory. For example, in some embodiments, method 500 is performed by server system 108 (FIGS. 1-2) or a component thereof (e.g., server-side module 106, FIGS. 1-2). In some embodiments, method 500 is governed by instructions that are stored in a non-transitory computer readable storage medium and the instructions are executed by one or more processors of the server system. Optional operations are indicated by dashed lines (e.g., boxes with dashed-line borders).

In some embodiments, data processing for the social networking platform is implemented in client-server environment 100 (FIG. 1) with a server system 108 and client-side module 102 executed on one or more client devices 104. In some embodiments, server system 108 (FIGS. 1-2) manages and operates the social networking platform, where the social networking platform includes the group messaging feature. For example, the social networking platform is an IM (Instant Messenger) application, an SNS (Social Networking Services) application, or the like, or a combination thereof. In some embodiments, a respective client-side module 102 (FIGS. 1 and 3) is associated with a user account in the social networking platform that corresponds to a user of client device 104 (FIGS. 1 and 3).

The server receives (502) a message sent by a first terminal and a first user identifier corresponding to the first terminal. For example, the first terminal is one of client devices 104 (FIGS. 1 and 3). Continuing with this example, the first user corresponding to the first terminal sends the message to a group of users associated with a group chat in the social networking platform. The message sent by the first terminal may be an instant chat message or a social network update message. In FIG. 4A, for example, while the first terminal displays interface 400 for a chat group within the social networking platform, the first terminal detects a specific character (e.g., the "@" symbol) input by the first user of the first terminal in text entry box 404. Continuing with this example, in FIG. 4B, the first terminal displays interface 410 in response to detecting input of the "@" symbol in text entry box 404 in FIG. 4A. In FIG. 4B, interface 410 enables the first user of first client device 104-1 to select one or more target recipients from the list of users subscribed to the group chat (e.g., with a touch input or stylus selection). For example, in FIG. 4B, the first terminal detects contact 412 at a location corresponding to "Andy," a respective user in the social networking platform that is subscribed to the group chat. Continuing with this example, in FIG. 4C, interface 420 includes message 422 in response to selection of "Andy" in FIG. 4B and entrance of text for a group message by the first user of first client device 104-1 (e.g., "Dinner with me tonight?"). In FIG. 4C, message 422 includes a tag 424 mentioning the target recipient for the group message (e.g., the "@" symbol followed by "Andy") and content 426 of the group message (e.g., "Dinner with me tonight?").

The server determines (504) whether the message sent by the first terminal includes a second user identifier for sending a targeted group message, where the second user identifier and the first user identifier correspond to a same group chat. In accordance with a determination that the message includes the second user identifier for sending a targeted group message, method 500 continues to operation 506. In accordance with a determination that the message does not include the second user identifier for sending a targeted group message, method 500 ends. For example, the group chat may be a group messaging feature of the social networking platform. The message may include at least one second user identifier for sending a targeted group message to a second user associated with the second user identifier. In some embodiments, the second user identifier does not have to be the user ID of the second user, but can be any name or aliases of the second user known to the server.

The server determines (506) a predetermined privacy setting for the second user account corresponding to the second user identifier. In accordance with a determination that the predetermined privacy setting indicates a preference for generic notifications, method 500 continues to operation 508. In accordance with a determination that the predetermined privacy setting indicates a preference for detailed notifications, method 500 continues to operation 510. For example, in FIG. 4D, settings interface 430 includes toggle/slider 432 for enabling or disabling detailed push notifications when the second user is mentioned in a group message in the group chat. The status of the predetermined privacy setting indicates whether the second user wishes to see message details (e.g., generic or detailed notifications) for group messages in which the user was mentioned. As such the server generates a different type of push notification (i.e., generic or detailed) based on the predetermined privacy setting for the second user account.

The server generates (508) a push notification with neither user information nor message content, and sends the push notification to a second terminal corresponding to the second user account. If the predetermined privacy setting for the second user account indicates that the second user has disabled display of message details, the server generates a push notification does not include user information corresponding to the sender of the group message and also does not include the content of the group message. FIG. 4E, for example, includes generic notification 440 that only indicates the application related to notification 440 (e.g., XX application or the social networking platform) and an indication 442 that someone mentioned the second user of second client device 104-2 in the group chat. As such, generic notification 440 in FIG. 4E does not include user information identifying the sender or the content of the group message that mentioned the second user of second client device 104-2.

The server generates (510) a push notification with at least one of user information identifying the sender and message content, and sends the push notification to a second terminal corresponding to the second user account. If the predetermined privacy setting for the second user account indicates that the second user has enabled display of message details, the server generates a push notification that includes at least one of user information corresponding to the sender of the group message and the content of the group message. FIG. 4F, for example, includes detailed notification 450 that indicates the application related to notification 450 (e.g., XX application or the social networking platform) and an indication 452 that "Tom" mentioned the second user of second client device 104-2 in the group chat. As such, detailed notification 450 in FIG. 4F includes user information identifying the sender (i.e., "Tom"). FIG. 4H, for example, includes detailed notification 470 that indicates the application related to notification 470 (e.g., XX application or the social networking platform) and an indication 452 that "Tom" mentioned the second user of second client device 104-2 in the group chat and the content of the group message in which "Tom" mentioned the second user of second client device 104-2 (e.g., "XYZ, come to the movies with me tonight . . . "). As such, detailed notification 470 in FIG. 4H includes user information identifying the sender (i.e., "Tom") and the content of the group message that mentioned the second user of second client device 104-2 (i.e., "XYZ, come to the movies with me tonight . . . ").

In method 500, targeted push notifications for a group chat can both ensure timely delivery of a group message and reduce unwanted notifications for group messages in which a user is not mentioned. In addition, the user is able to select a predetermined privacy setting for push notifications to effectively avoid information leakage and improve security.

It should be understood that the particular order in which the operations in FIG. 5 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 700, 800, and 900) are also applicable in an analogous manner to method 800 described above with respect to FIG. 5.

Attention is now directed towards embodiments of user interfaces and associated processes that may be implemented on a client device 104 with a touch screen (sometimes also herein called a "touch screen display") enabled to receive one or more touch inputs and display information (e.g., media content, websites and web pages thereof, and/or user interfaces for an application such as a web browser and the first and second social networking platform applications). FIGS. 6A-6D illustrate exemplary user interfaces for providing notifications to users for group messages transmitted over a social networking platform in accordance with some embodiments.

FIGS. 6A-6D show a user interface displayed on a third client device 104-3 (e.g., a mobile phone) executing the social networking platform (e.g., client-side module 102, FIGS. 1 and 3); however, one skilled in the art will appreciate that the user interfaces shown in FIGS. 6A-6D may be implemented on other similar computing devices. The user interfaces in FIGS. 6A-6D are used to illustrate the methods described in FIGS. 7-8.

For example, third client device 104-3 is associated with a third user that is subscribed to the same chat group provided by the social networking platform as the first user (e.g., the sender of the group message in FIGS. 4A-4C) corresponding to first client device 104-1 and the second user (e.g., the recipient of the group message in FIGS. 4D-4H) corresponding to second client device 104-2.

Figure 6B:
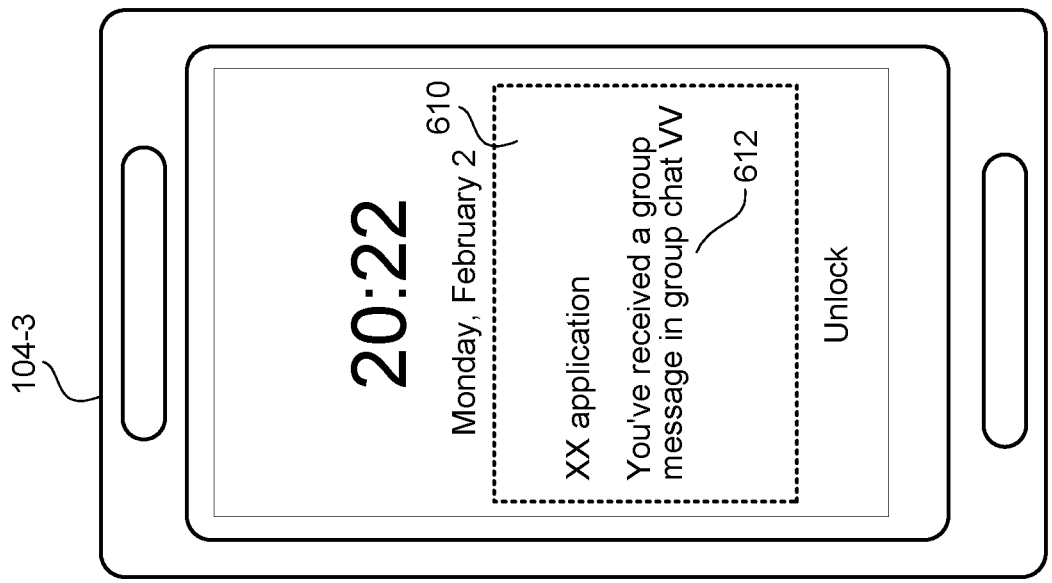
FIGS. 6A-6D illustrate exemplary user interfaces for providing notifications to users for group messages transmitted over a social networking platform in accordance with some embodiments.
Figure 6A:
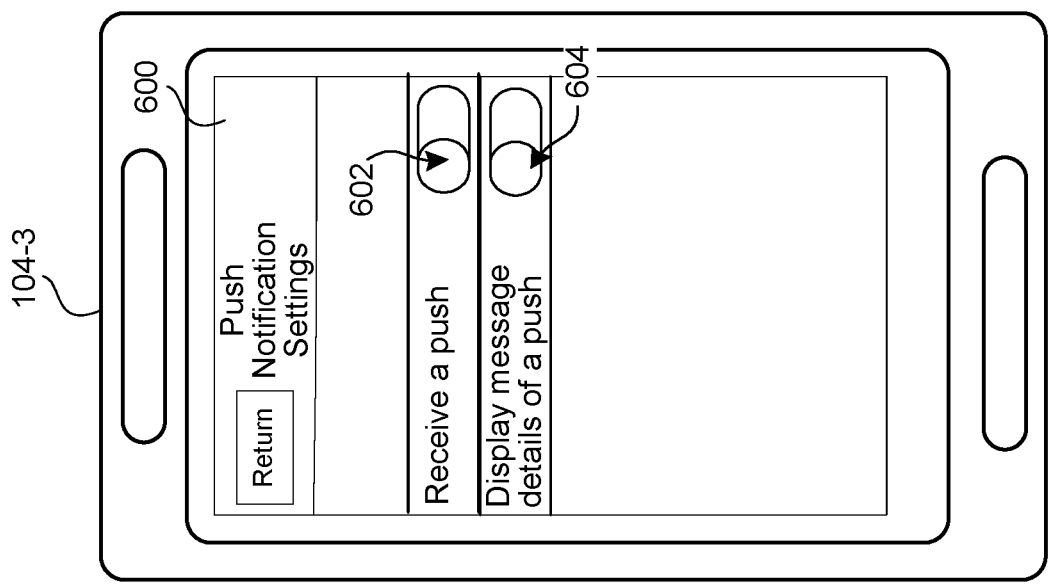

FIG. 6A illustrates third client device 104-3 displaying settings interface 600 for the social networking platform. In FIG. 6A, settings interface 600 includes a first toggle/slider 602 for enabling or disabling push notifications for group messages sent in the group chat and a second toggle/slider 604 for enabling or disabling detailed push notifications.

FIG. 6B illustrates third client device 104-3 displaying a notification 610 on the lock screen of third client device 104-3. In FIG. 6B, notification 610 is a generic notification that only indicates the application related to notification 610 (e.g., XX application or the social networking platform) and an indication 612 that someone sent a group message in group chat VV.

Figure 6D:
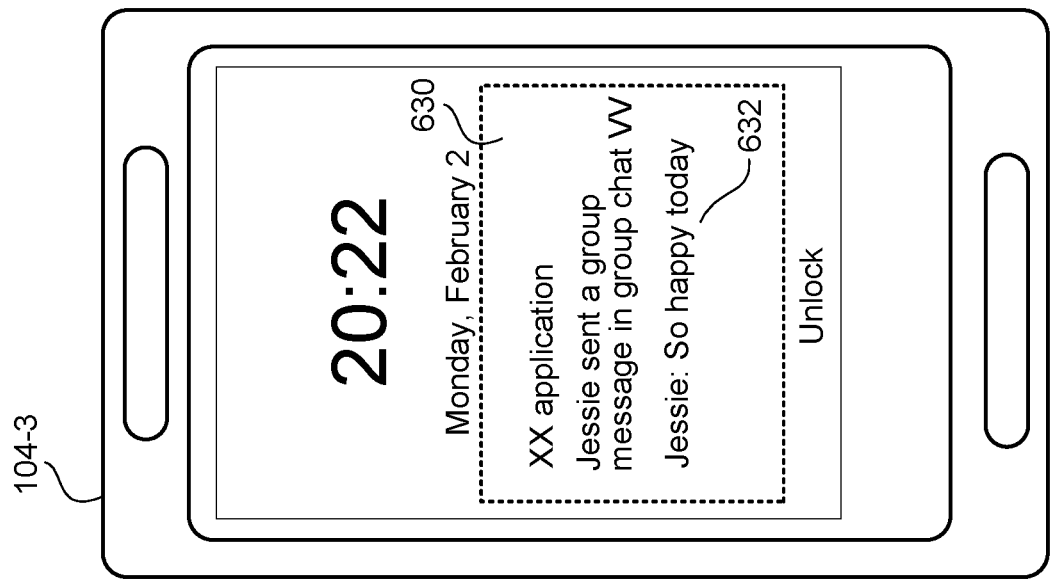
Figure 6C:
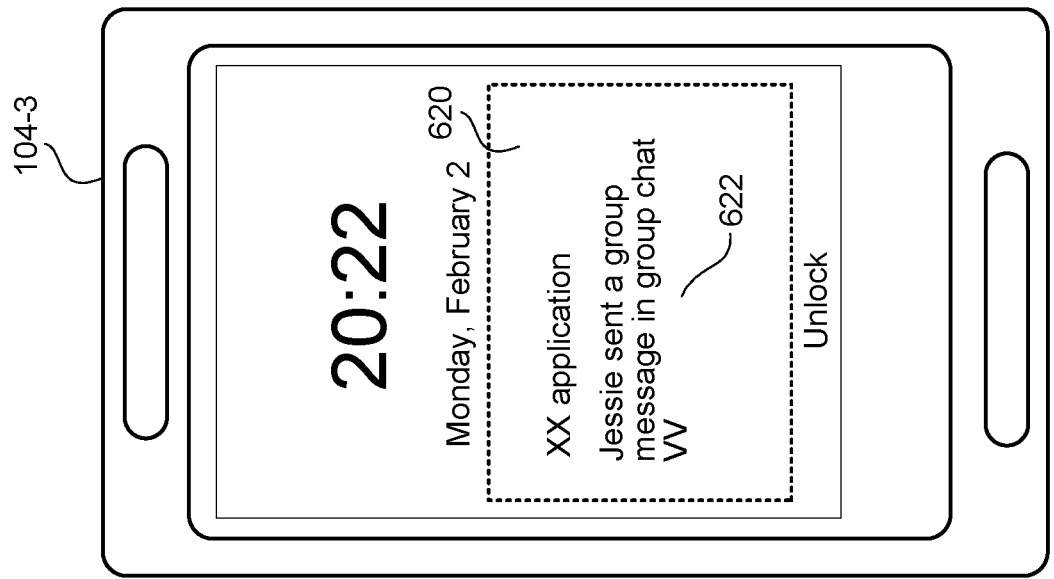

FIG. 6C illustrates third client device 104-3 displaying a notification 620 on the lock screen of third client device 104-3. In FIG. 6C, notification 620 is a detailed notification that indicates the application related to notification 620 (e.g., XX application or the social networking platform) and an indication 622 that "Jessie" sent a group message in group chat VV.

FIG. 6D illustrates third client device 104-3 displaying a notification 630 on the lock screen of third client device 104-3. In FIG. 6D, notification 630 is a detailed notification that indicates the application related to notification 630 (e.g., XX application or the social networking platform) and an indication 632 that "Jessie" sent a group message in group chat VV and the content of the group message (e.g., "So happy today").

Figure 7:
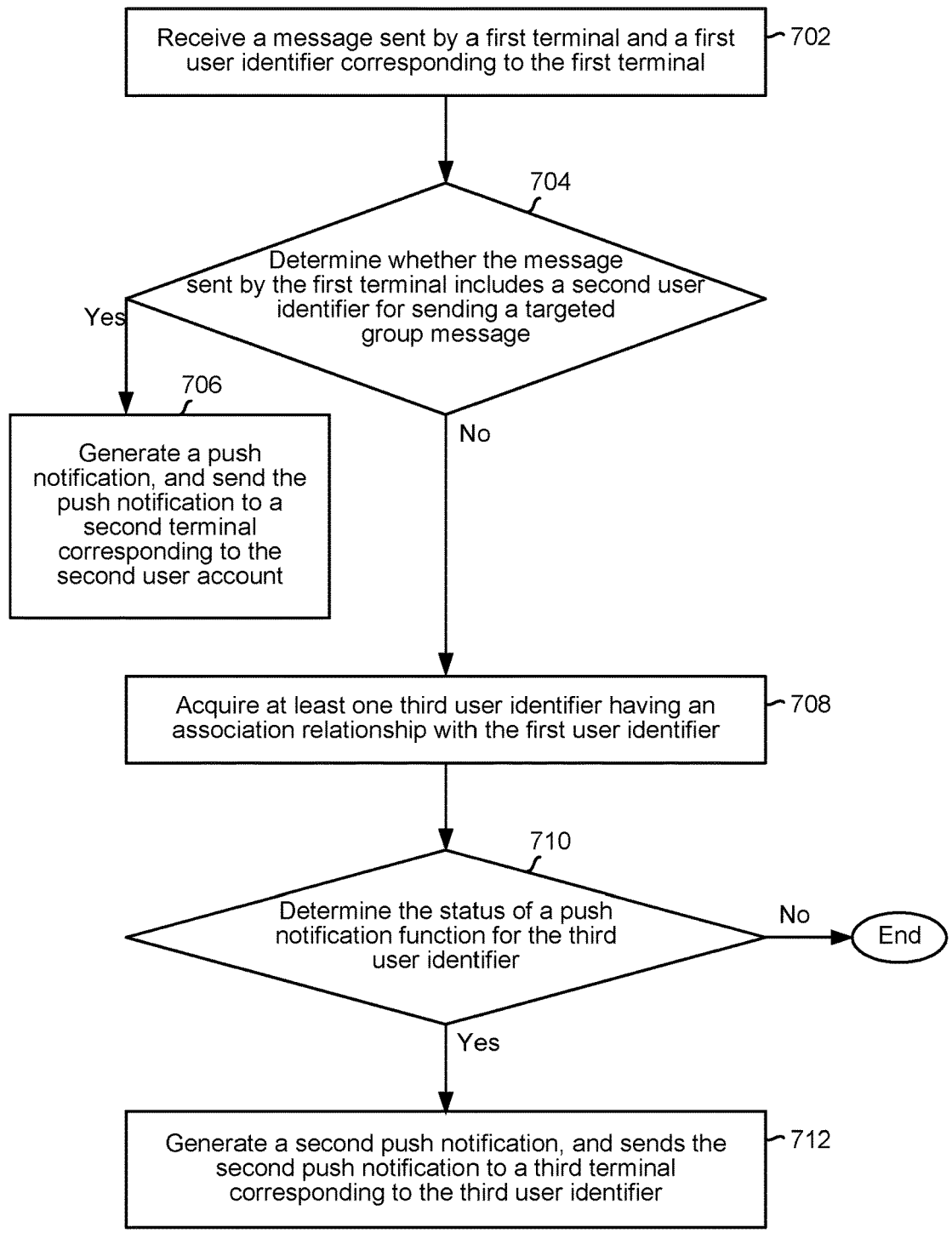
FIG. 7 illustrate a flowchart diagram of a method of providing notifications to users for group messages in accordance with some embodiments.

FIG. 7 illustrates a flowchart diagram of a method 700 of providing notifications to users for group messages in accordance with some embodiments. In some embodiments, method 700 is performed by a server with one or more processors and memory. For example, in some embodiments, method 700 is performed by server system 108 (FIGS. 1-2) or a component thereof (e.g., server-side module 106, FIGS. 1-2). In some embodiments, method 500 is governed by instructions that are stored in a non-transitory computer readable storage medium and the instructions are executed by one or more processors of the server system. Optional operations are indicated by dashed lines (e.g., boxes with dashed-line borders).

In some embodiments, data processing for the social networking platform is implemented in client-server environment 100 (FIG. 1) with a server system 108 and client-side module 102 executed on one or more client devices 104. In some embodiments, server system 108 (FIGS. 1-2) manages and operates the social networking platform, where the social networking platform includes the group messaging feature. For example, the social networking platform is an IM (Instant Messenger) application, an SNS (Social Networking Services) application, or the like, or a combination thereof. In some embodiments, a respective client-side module 102 (FIGS. 1 and 3) is associated with a user account in the social networking platform that corresponds to a user of client device 104 (FIGS. 1 and 3).

The server receives (702) a message sent by a first terminal and a first user identifier corresponding to the first terminal. For example, the first terminal is one of client devices 104 (FIGS. 1 and 3). The message sent by the first terminal may be any one of an instant chat message and a social network update message.

The server determines (704) whether the message sent by the first terminal includes a second user identifier for sending a targeted group message, where the second user identifier and the first user identifier correspond to a same group chat. In accordance with a determination that the message includes the second user identifier for sending a targeted group message, method 700 continues to operation 706. In accordance with a determination that the message does not include the second user identifier for sending a targeted group message, method 700 continues to operation 708. For example, the group chat may be a group messaging feature of an instant messaging application or the social networking platform. The message may include at least one second user identifier for sending a targeted group message to a second user associated with the second user identifier.

The server generates (706) a push notification, and sends the push notification to a second terminal corresponding to the second user account. In some embodiments, prior to sending the push notification to the second terminal, the server determines a predetermined privacy setting for the second user account. the predetermined privacy setting for the second user account indicates that the second user has disabled display of message details, the server generates a push notification does not include user information corresponding to the sender of the group message and also does not include the content of the group message. For example, see generic notification 440 in FIG. 4E. If the predetermined privacy setting for the second user account indicates that the second user has enabled display of message details, the server generates a push notification that includes at least one of user information corresponding to the sender of the group message and the content of the group message. For example, see detailed notification 450 in FIG. 4F and detailed notification 470 in FIG. 4H.

The server acquires (708) at least one third user identifier having an association relationship with the first user identifier. The association relationship includes, but is not limited to, a friend relationship, a following relationship, and a relationship of correspondence to a same chat group. In some embodiments, the server acquires a group identifier corresponding to the message, and acquires, according to the group identifier, at least one third user identifier corresponding to the group chat.

The server determines (710) the status of a push notification function for the third user identifier. In accordance with a determination that the notification function is enabled, method 700 continues to operation 712. In accordance with a determination that the notification function is disabled, method 700 ends. For example, FIG. 6A shows first toggle/slider 602 for enabling or disabling push notifications for group messages sent in the group chat.

The server generates (712) a second push notification, and sends the second push notification to a third terminal corresponding to the third user identifier.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600, 800, and 900) are also applicable in an analogous manner to method 700 described above with respect to FIG. 7.

Figure 8:
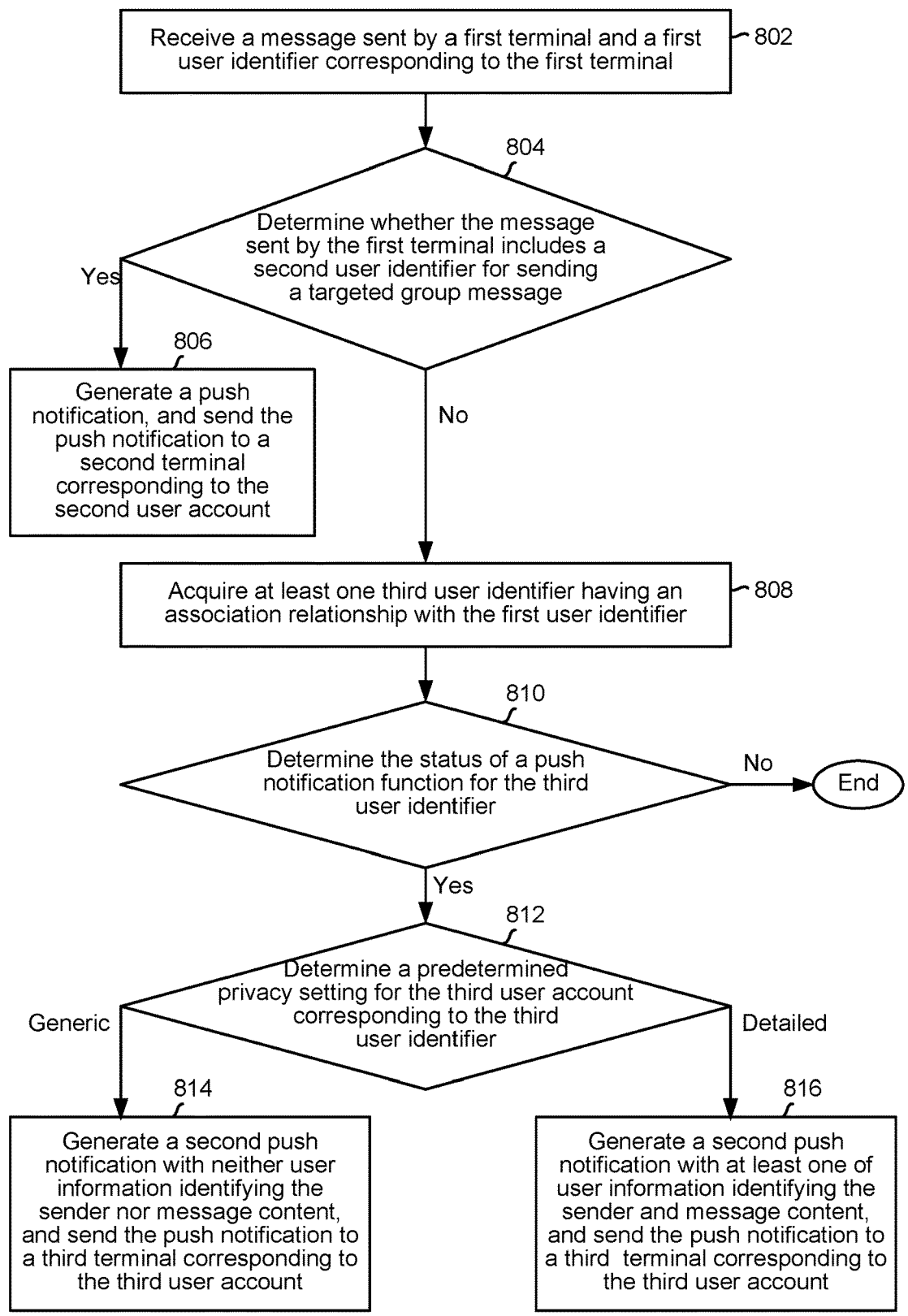
FIG. 8 illustrate a flowchart diagram of a method of providing notifications to users for group messages in accordance with some embodiments.

FIG. 8 illustrates a flowchart diagram of a method 800 of providing notifications to users for group messages in accordance with some embodiments. In some embodiments, method 800 is performed by a server with one or more processors and memory. For example, in some embodiments, method 800 is performed by server system 108 (FIGS. 1-2) or a component thereof (e.g., server-side module 106, FIGS. 1-2). In some embodiments, method 800 is governed by instructions that are stored in a non-transitory computer readable storage medium and the instructions are executed by one or more processors of the server system. Optional operations are indicated by dashed lines (e.g., boxes with dashed-line borders).

In some embodiments, data processing for the social networking platform is implemented in client-server environment 100 (FIG. 1) with a server system 108 and client-side module 102 executed on one or more client devices 104. In some embodiments, server system 108 (FIGS. 1-2) manages and operates the social networking platform, where the social networking platform includes the group messaging feature. For example, the social networking platform is an IM (Instant Messenger) application, an SNS (Social Networking Services) application, or the like, or a combination thereof. In some embodiments, a respective client-side module 102 (FIGS. 1 and 3) is associated with a user account in the social networking platform that corresponds to a user of client device 104 (FIGS. 1 and 3).

The server receives (802) a message sent by a first terminal and a first user identifier corresponding to the first terminal. For example, the first terminal is one of client devices 104 (FIGS. 1 and 3). The message sent by the first terminal may be any one of an instant chat message and a social network update message.

The server determines (804) whether the message sent by the first terminal includes a second user identifier for sending a targeted group message, where the second user identifier and the first user identifier correspond to a same group chat. In accordance with a determination that the message includes the second user identifier for sending a targeted group message, method 800 continues to operation 806. In accordance with a determination that the message does not include the second user identifier for sending a targeted group message, method 800 continues to operation 808. For example, the group chat may be a group messaging feature of an instant messaging application or the social networking platform. The message may include at least one second user identifier for sending a targeted group message to a second user associated with the second user identifier.

The server generates (806) a push notification, and sends the push notification to a second terminal corresponding to the second user account irrespective of the status of the group chat notification function for the second user account. In some embodiments, prior to sending the push notification to the second terminal, the server determines a predetermined privacy setting for the second user account. the predetermined privacy setting for the second user account indicates that the second user has disabled display of message details, the server generates a push notification does not include user information corresponding to the sender of the group message and also does not include the content of the group message. For example, see generic notification 440 in FIG. 4E. If the predetermined privacy setting for the second user account indicates that the second user has enabled display of message details, the server generates a push notification that includes at least one of user information corresponding to the sender of the group message and the content of the group message. For example, see detailed notification 450 in FIG. 4F and detailed notification 470 in FIG. 4H.

The server acquires (808) at least one third user identifier having an association relationship with the first user identifier. The association relationship includes, but is not limited to, a friend relationship, a following relationship, and a relationship of correspondence to a same chat group. In some embodiments, the server acquires a group identifier corresponding to the message, and acquires, according to the group identifier, at least one third user identifier corresponding to the group chat.

The server determines (810) the status of a push notification function for the third user identifier. In accordance with a determination that the notification function is enabled, method 800 continues to operation 812. In accordance with a determination that the notification function is disabled, method 800 ends. For example, FIG. 6A shows first toggle/slider 602 for enabling or disabling push notifications for group messages sent in the group chat.

The server determines (812) whether a predetermined privacy setting for the third user account corresponding to the third user identifier. In accordance with a determination that the predetermined privacy setting indicates a preference for generic notifications, method 800 continues to operation 814. In accordance with a determination that the predetermined privacy setting indicates a preference for detailed notifications, method 800 continues to operation 816. For example, in FIG. 6A, settings interface 600 includes a second toggle/slider 604 for enabling or disabling detailed push notifications. The status of the predetermined privacy setting indicates whether the third user wishes to see message details (e.g., generic or detailed notifications) for group messages. As such the server generates a different type of push notification (i.e., generic or detailed) based on the predetermined privacy setting for the third user account.

The server generates (814) a second push notification with neither user information identifying the sender nor message content, and send the push notification to a third terminal corresponding to the third user account. If the predetermined privacy setting for the third user account indicates that the third user has disabled display of message details, the server generates a push notification does not include user information corresponding to the sender of the group message and also does not include the content of the group message. FIG. 6B, for example, includes generic notification 610 that only indicates the application related to notification 610 (e.g., XX application or the social networking platform) and an indication 612 that someone sent a group message in group chat VV. As such, generic notification 610 in FIG. 6B does not include user information identifying the sender or the content of the group message in group chat VV.

The server generates (816) a second push notification with at least one of user information identifying the sender and message content, and send the push notification to a third terminal corresponding to the third user account. If the predetermined privacy setting for the third user account indicates that the third user has enabled display of message details, the server generates a push notification that includes at least one of user information corresponding to the sender of the group message and the content of the group message. FIG. 6C, for example, includes detailed notification 620 that indicates the application related to notification 620 (e.g., XX application or the social networking platform) and an indication 622 that "Jessie" sent a group message in group chat VV. As such, detailed notification 620 in FIG. 6C includes user information identifying the sender (i.e., "Jessie") of the group message. FIG. 6D, for example, includes detailed notification 630 that indicates the application related to notification 630 (e.g., XX application or the social networking platform) and an indication 632 that "Jessie" sent a group message in group chat VV and the content of the group message (e.g., "So happy today"). As such, detailed notification 630 in FIG. 6D includes user information identifying the sender (i.e., "Jessie") and the content of the group message.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600, 700, and 900) are also applicable in an analogous manner to method 800 described above with respect to FIG. 8.

Figure 9A:
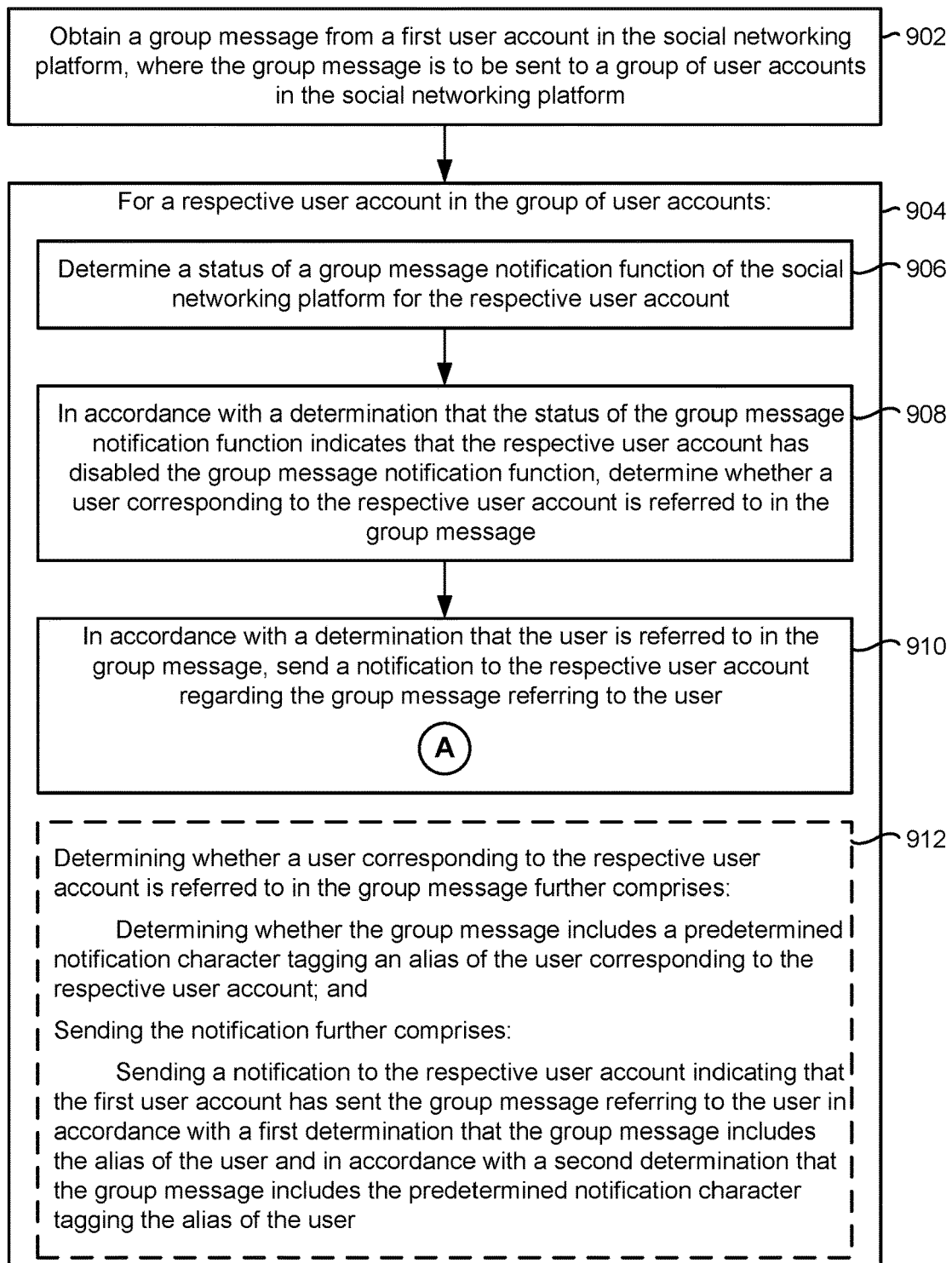
Figure 9B:
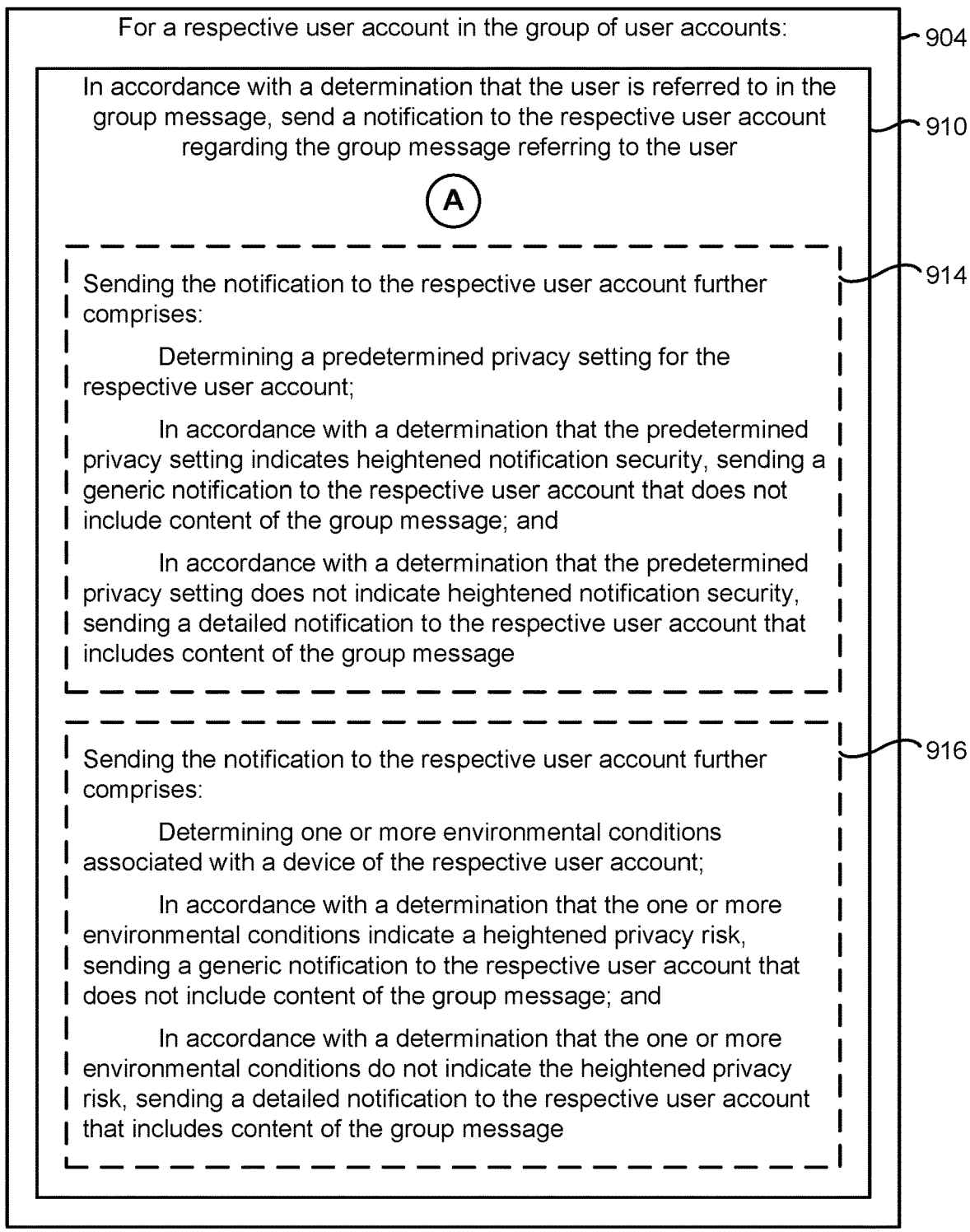

FIGS. 9A-9C illustrate a flowchart diagram of a method 900 of providing notifications to users for group messages in accordance with some embodiments. In some embodiments, method 900 is performed by a server with one or more processors and memory. For example, in some embodiments, method 900 is performed by server system 108 (FIGS. 1-2) or a component thereof (e.g., server-side module 106, FIGS. 1-2). In some embodiments, method 900 is governed by instructions that are stored in a non-transitory computer readable storage medium and the instructions are executed by one or more processors of the server system. Optional operations are indicated by dashed lines (e.g., boxes with dashed-line borders).

In some embodiments, data processing for the social networking platform is implemented in client-server environment 100 (FIG. 1) with a server system 108 and client-side module 102 executed on one or more client devices 104. In some embodiments, server system 108 (FIGS. 1-2) manages and operates the social networking platform, where the social networking platform includes the group messaging feature. For example, the social networking platform is an IM (Instant Messenger) application, an SNS (Social Networking Services) application, or the like, or a combination thereof. In some embodiments, a respective client-side module 102 (FIGS. 1 and 3) is associated with a user account in the social networking platform that corresponds to a user of client device 104 (FIGS. 1 and 3).

The server obtains (902) a group message from a first user account in the social networking platform, where the group message is to be sent to a group of user accounts in the social networking platform. For example, the message is sent within a group chat or group messaging feature of the social networking platform. In some embodiments, the group message is a message posted to a group on a social network platform, a message sent in a group chat, or a message posted to a public forum (e.g., bulletin board) with multiple subscribers/followers. In some embodiments, the group messages is visible to an entire group of people on the social network platform, even though the message may mention a particular member of the group, or be sent by a member of the group.

For a respective user account in the group of user accounts (904), the server determines (906) a status of a group message notification function of the social networking platform for the respective user account. For example, the group of user accounts including the respective user account corresponding to and the first user account (i.e., the sender) subscribe to a same group chat or group messaging feature of the social networking platform, which is provided by server system 108. In some embodiments, server system 108 or a component thereof (e.g., notification status determination module 220, FIG. 2) determines the status of a group message notification function for the respective user in response to obtaining the group message sent to the users subscribed to the group chat by the first user account. For example, the respective user account previously indicated a preference (e.g., stored in a user profile for the respective user) not to receive notifications messages sent in the group chat. In another example, the respective user account previously indicated a preference (e.g., stored in a user profile for the respective user) not to receive notifications. In some embodiments, the user of the user account is able to indicate his/her preference for receiving notifications for new group messages during registration or at a subsequent time via a setting interface. For example, in FIG. 6A, settings interface 600 includes a first toggle/slider 602 for enabling or disabling push notifications for group messages sent in the group chat.

For a respective user account in the group of user accounts (904), the server determines (908) whether a user corresponding to the respective user account is referred to in the group message in accordance with a determination that the status of the group message notification function indicates that the respective user account has disabled the group message notification function. In some embodiments, server system 108 or a component thereof (e.g., user identification module 222, FIG. 2) determines whether one or more users are mentioned in the group message and identifies one or more user accounts in the social networking platform that corresponding to the one or more mentioned users. In some embodiments, user identification module 222 determines that a user name in the social networking platform is included in the group message that corresponds to the respective user or an alias used by the respective user is included in the group message. For example, the user of the user account is referred to by any number of names or aliases of the user that are known to the server. In some embodiments, the criteria for identifying the user account mentioned in the group message may include requiring the name or alias be tagged with a special character. In some embodiments, the server determines whether the user corresponding to the respective user account has been explicitly selected by the sender of the group message to receive the notification for the group message.

For a respective user account in the group of user accounts (904), the server sends (910) a notification to the respective user account regarding the group message referring to the user in accordance with a determination that the user is referred to in the group message. In some embodiments, server system 108 or a component thereof (e.g., sending module 228, FIG. 2) sends a notification to the respective user account indicating that the respective user account was mentioned in a group message sent by a user (i.e., the first user or sender) within a chat group or group messaging feature in the social networking platform. For example, the notification is a generic one that only includes the sender's name or only indicates that the respective user account was mentioned in the message. In another example, the notification is a detailed one that includes the message in which the respective user account was mentioned. Specifically, the notification is sent despite the disabled state of the group message notification function. In some embodiments, the notification may be silent to reduce disturbance to the user of the user account, if the default notification mode includes a sound or vibrate alert in addition to the notification message itself.

In some embodiments, the server determines whether a user corresponding to the respective user account is referred to in the group message by (912) determining whether the group message includes a predetermined notification character tagging an alias of the user corresponding to the respective user account, and the server sends the notification by sending a notification to the respective user account indicating that the first user account has sent the group message referring to the user in accordance with a first determination that the group message includes the alias of the user and in accordance with a second determination that the group message includes the predetermined notification character tagging the alias of the user. In some embodiments, server system 108 or a component thereof (e.g., user identification module 222, FIG. 2) determines whether one or more users are mentioned in the group message by identifying alias(es)/name(s) tagged with a special character and identifying one or more user accounts in the social networking platform that corresponding to the one or more tagged alias(es)/name(s). For example, the special character is an "@" symbol preceding or following the user name. In FIG. 4C, for example, group message 424 includes "@Andy" where the "@" symbol tags the target recipient's alias/name (i.e., "Andy").

In some embodiments, the server sends the notification to the respective user account by (914): determining a predetermined privacy setting for the respective user account; in accordance with a determination that the predetermined privacy setting indicates heightened notification security, sending a generic notification to the respective user account that does not include content of the group message; and, in accordance with a determination that the predetermined privacy setting does not indicate heightened notification security, sending a detailed notification to the respective user account that includes content of the group message. In some embodiments, server system 108 or a component thereof (e.g., context information obtaining module 224, FIG. 2) obtains a notification privacy setting for the respective user account mentioned in the group message. For example, the notification privacy setting for the respective user account is located in a user profile corresponding to the respective user account which the user of the user account set during registration of his/her user account for the social networking or at a subsequent time via a settings interface. For example, FIG. 4D shows settings interface 430 includes toggle/slider 432 for enabling or disabling detailed push notifications when the respective user is mentioned in a group message in the group chat.

Continuing with the example above in operation 914, if the predetermined privacy setting is enabled, which indicates heightened notification security, server system 108 or a component thereof (e.g., notification type determination module 226, FIG. 2) determines that the respective user account wishes to receive the generic notification type for heightened security and sends the respective user account a generic notification a type of notification. Alternatively, continuing with the example above in operation 914, if the predetermined privacy setting is disabled, which does not indicate heightened notification security, server system 108 or a component thereof (e.g., notification type determination module 226, FIG. 2) determines that the respective user account wishes to receive the detailed notification and sends the respective user account a detailed notification. In some embodiments, the generic message indicates that a message referring to the user has been received. In some embodiments, the generic message indicates the identity of the sender of the message. In some embodiments, the detailed notification includes both the identity of the sender and the content of the group message referring to the user.

In some embodiments, the server sends the notification to the respective user account by (916): determining one or more environmental conditions associated with a device of the respective user account; in accordance with a determination that the one or more environmental conditions indicate a heightened privacy risk, sending a generic notification to the respective user account that does not include content of the group message; and, in accordance with a determination that the one or more environmental conditions do not indicate the heightened privacy risk, sending a detailed notification to the respective user account that includes content of the group message. In some embodiments, server system 108 or a component thereof (e.g., context information obtaining module 224, FIG. 2) obtains one or more environmental conditions for the respective user account mentioned in the group message. In some embodiments, the environmental condition(s) are related to readings and/or measurements from the speakers, ambient light sensor, GPS, location tracks, accelerometer, gyroscope, and/or the like of the phone of the user of the respective user account. For example, a heightened privacy risk exists when the one or more environmental conditions indicate that the phone of the user of the respective user account is face-up, in motion, in a crowded area, and/or the like. In another example, the heightened privacy risk does not exist when the one or more environmental conditions indicate that the phone of the user of the respective user account is in-hand, in-pocket, face-down, and/or the like. In some embodiments, if the phone of the user of the respective user account is locked and the notification is to be displayed on the lock screen, the heightened privacy risk exists.

Continuing with the example above in operation 916, if the one or more environmental conditions indicate the heightened privacy risk, server system 108 or a component thereof (e.g., notification type determination module 226, FIG. 2) determines that the respective user account should receive the generic notification type for heightened security and sends the respective user account a generic notification a type of notification. Alternatively, continuing with the example above in operation 914, if the one or more environmental conditions do not indicate the heightened privacy risk, server system 108 or a component thereof (e.g., notification type determination module 226, FIG. 2) determines that the respective user account should receive the detailed notification and sends the respective user account a detailed notification. In some embodiments, the generic message indicates that a message referring to the user has been received. In some embodiments, the generic message indicates the identity of the sender of the message. In some embodiments, the detailed notification includes both the identity of the sender and the content of the group message referring to the user.

In some embodiments, after sending the notification to the respective user account, the server obtains (918) at least one subsequent group message from the group of user accounts in the social networking platform that refers to the user corresponding to the respective user account and, in response to obtaining the at least one subsequent group message, the server sends an updated notification to the respective user account indicating a current count of times that the user has been referred to in group messages sent among the group of user accounts in the social networking platform. In some embodiments, the device of the user of the respective user account replaces display of the original notification with the updated notification. In some embodiments, the current count is tallied starting from the time that the first unread notification regarding the mentioning of the user was sent by the server. The count is reset to zero when the user reads the most current notification regarding the mention of the user in the group messages. FIG. 4G, for example, shows second client device 104-2 displaying a notification 460 on the lock screen of second client device 104-2. In FIG. 4G, notification 460 is a detailed notification that is a dynamically updated version of detailed notification 450 in FIG. 4F. In FIG. 4G, notification 460 includes an indication 462 of the number of times (i.e., Y times) that the second user of second client device 104-2 was mentioned in the group and the users in the group chat that mentioned the second user of second client device 104-2 (i.e., "Tom" and "Sally").

In some embodiments, after sending the notification to the respective user account, the server obtains (920) at least one subsequent group message from the group of user accounts in the social networking platform and, in response to obtaining the at least one subsequent group message, sends an updated notification to the respective user account indicating a count of group messages sent by the group of user accounts in the social networking platform since the group message was sent by the first user account that referred to the user corresponding to the respective user account. In some embodiments, the updated notification indicates likes or comments directed to the original message that mentioned the respective user account.

In some embodiments, the notification is a generic notification that does not include content of the group message, and the server (922): receives an input from the respective user to display the content of the group message; and, in response to receiving the input, sending a detailed notification to the respective user account that includes the content of the group message. For example, the original notification only indicates that the recipient was mentioned in the group chat (i.e., a generic notification). After selecting the original notification, for example, the device displays the content of the group message in the group chat that mentioned the recipient (i.e., a detailed notification). After selecting the original notification, in another example, the device executes the social networking platform and displays the group chat interface. Note that if the generic notification is shown on the lock screen, the detailed notification is also shown on the lock screen after the user input selecting the generic notification. If the generic notification is shown on the screen while an application other than the native application of the group message is active, the detailed notification is also shown in the screen without activating the native application. When the user selects the detailed notification, the native application of the group message is activated, and the user can be shown the message context (e.g., other messages) of the group message that referred to the user. In some embodiments, if dynamic notification for the group messages that mentioned the user is implemented, and if the notification indicates multiple group messages have mentioned the user, when the user selects the notification, the multiple group messages are shown to the user (e.g., on the lock screen or over the UI of another app) without activating the native application of the group messages. If the user selects one of the multiple messages, then the native application of the group messages can be activated, and all the messages in the group including other group messages that did not refer to the user are displayed to the user.

In some embodiments, after sending the notification to the respective user account, the server provides (924) a status indicator to the first user account indicating a presentation status of the notification with respect to the respective user account. In some embodiments, server system 108 or a component thereof (e.g., status providing module 230, FIG. 2) provides the first user account (i.e., associated with the sender of the group message) a status indicator (e.g., delivered, read, or notified) indicating a presentation status of the notification with respect to the respective user account (i.e., the target recipient mentioned in the group message). For example, the notification is merely "delivered" when neither a detailed nor generic notification has yet been displayed by the device of the respective user account. For example, the notification is "read" when the detailed message including the content of the message sent by the first user account has been displayed by the device of the respective user account. For example, the notification is "notified" when the generic message without the content of the message sent by the first user account has been displayed by the device of the respective user account.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods and/or processes described herein (e.g., methods 600, 700, and 800) are also applicable in an analogous manner to method 900 described above with respect to FIGS. 9A-9C.

Figure 10:
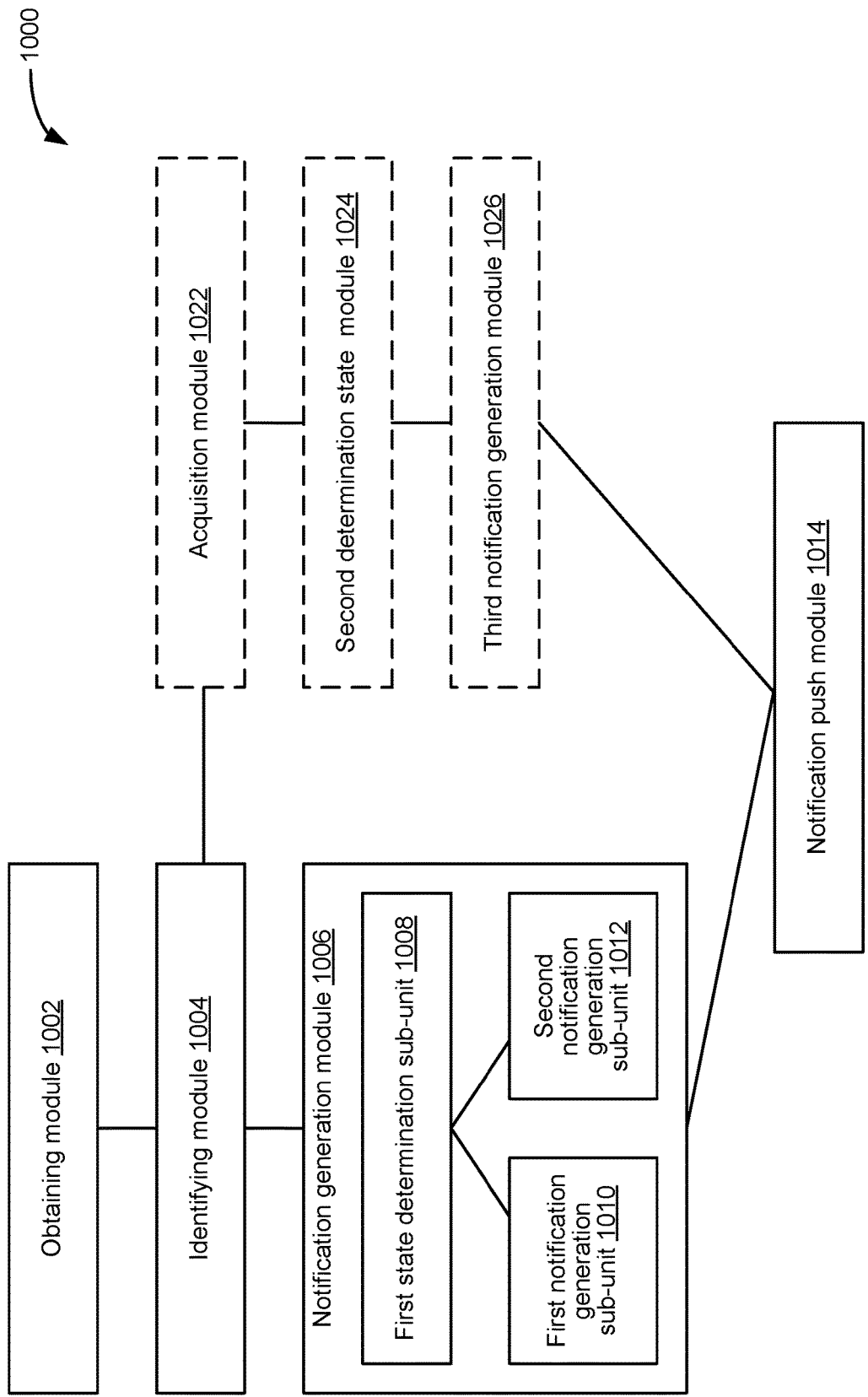
FIG. 10 is a block diagram of a push notification system in accordance with some embodiments.

FIG. 10 is a block diagram of a notification push system 1000 in accordance with some embodiments. In some embodiments, notification push system 1000 corresponds to notification module 218 of server system 108. In some embodiments, server system 108 manages and operates a social networking platform that includes a group messaging feature. In some embodiments, a plurality of user accounts in the social networking platform subscribe to a group chat associate with the group messaging feature. In some embodiments, a notification function notifies user account subscribed to the group chat when a new message is posted/sent in the group chat.

In some embodiments, notification push system 1000 includes: obtaining module 1002; identifying module 1004; message generation module 1006; and notification push module 1014.

In some embodiments, obtaining module 1002 is configured to obtain a group message sent by a first user account in a group chat.

In some embodiments, identifying module 1004 is configured to identify at least a respective user mentioned in the group message.

In some embodiments, notification generation module 1006 is configured to generate a notification indicating that the respective user has been mentioned in a group message.

In some embodiments, notification push module 1014 is configured to push the notification generated by notification generation module 1006 to a terminal corresponding to the respective user.

In some embodiments, message generation module 1006 includes: first state determination sub-unit 1008; first notification generation sub-unit 1010; and second notification generation sub-unit 1012.

In some embodiments, first state determination sub-unit 1008 is configured to determine a notification setting for the respective user indicating whether the respective user wishes to receive message details.

In some embodiments, first notification generation sub-unit 1010 is configured to generate a detailed notification with the content of the group message and/or the identity of the sender of the group message in accordance with a determination by first state determination sub-unit 1008 that the respective user wishes to receive message details.

In some embodiments, second notification generation sub-unit 1012 is configured to generate a generic notification with neither the content of the group message nor the identity of the sender of the group message in accordance with a determination by first state determination sub-unit 1008 that the respective user does not wish to receive message details.

In some embodiments, notification push system 1000 further includes: acquisition module 1022; second state determination module 1024; and third notification generation module 1026.

In some embodiments, acquisition module 1022 is configured to acquire at least one third user identifier having an association relationship with the first user identifier (i.e., the sender of the group message).

In some embodiments, second state determination module 1024 is configured to determine the status of a push notification function for the third user identifier.

In some embodiments, third notification generation module 1026 is configured to generate a push notification to be sent to a terminal of a user associated with the third user identifier in accordance with a determination by second state determination module 1024 that user associated with the third user identifier wishes to receive push notifications when group messages are sent in the group chat.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of providing a notification to users of a chat group for group messages transmitted over a social networking platform, the method comprising:
   at a server with one or more processors and memory:
      receiving a group message from a first terminal associated with a first user account of the social networking platform, wherein the group message is to be sent to a plurality of user accounts associated with the users of the chat group of which the first user account is a member, each of the plurality of user accounts has elected a disabled status for the group message's notification function;
      dividing the plurality of user accounts into a first set of user accounts that have been selected by the first user at the first terminal as target recipients of the group message and a second set of user accounts that are not members of the first set of user accounts;
      for a respective user account within the first set of user accounts, sending the group message and a notification of the group message to a terminal associated with the respective user account despite of the respective user account's disabled status for the group message notification function, wherein the notification is rendered at the terminal in a first manner configured by the respective user account; and
      for a respective user account within the second set of user accounts, sending the group message and a notification of the group message to a terminal associated with the respective user account consistent with the respective user account's disabled status for the group message notification function, wherein the notification is rendered at the terminal in a second manner configured by the social networking platform, wherein the first manner includes more information related to the group message than the second manner.

2. The method of claim 1, wherein, for a respective user account within the second set of user accounts that have not been selected by the first user at the first terminal, sending the group message and a notification of the group message to a terminal associated with the respective user account consistent with the respective user account's disabled status for the group message notification function further comprises:
   in accordance with a determination that the social networking platform has disabled the feature of sending a group message notification to the respective user account, sending the group message without any notification to the terminal associated with the respective user account.

3. The method of claim 1, wherein, for a respective user account within the first set of user accounts, sending the group message and a notification of the group message to a terminal associated with the respective user account despite of the respective user account's disabled status for the group message notification function further comprises:
   sending the group message and the notification to the terminal associated with the respective user account, the notification including the first user account, wherein the notification is rendered at the terminal by displaying the first user account.

4. The method of claim 3, wherein sending the group message and the notification to the terminal associated with the respective user account further comprises:
   determining a predetermined privacy setting for the respective user account;
   in accordance with a determination that the predetermined privacy setting indicates heightened notification security, sending a generic notification to the respective user account that does not include content of the group message; and
   in accordance with a determination that the predetermined privacy setting does not indicate heightened notification security, sending a detailed notification to the respective user account that includes content of the group message.

5. The method of claim 3, wherein sending the group message and the notification to the terminal associated with the respective user account further comprises:
- determining one or more environmental conditions associated with a device of the respective user account;
- in accordance with a determination that the one or more environmental conditions indicate a heightened privacy risk, sending a generic notification to the respective user account that does not include content of the group message; and
- in accordance with a determination that the one or more environmental conditions do not indicate the heightened privacy risk, sending a detailed notification to the respective user account that includes content of the group message.

6. The method of claim 3, further comprising:
- after sending the notification to the respective user account, obtaining at least one subsequent group message from the group of user accounts in the social networking platform that refers to the user corresponding to the respective user account; and
- in response to obtaining the at least one subsequent group message, sending an updated notification to the respective user account indicating a current count of times that the user has been referred to in group messages sent among the group of user accounts in the social networking platform.

7. The method of claim 3, further comprising:
- after sending the notification to the respective user account, obtaining at least one subsequent group message from the group of user accounts in the social networking platform; and
- in response to obtaining the at least one subsequent group message, sending an updated notification to the respective user account indicating a count of group messages sent by the group of user accounts in the social networking platform since the group message was sent by the first user account that referred to the user corresponding to the respective user account.

8. The method of claim 1, wherein dividing the plurality of user accounts into a first set of user accounts that have been selected by the first user at the first terminal for the group message and a second set of user accounts that have not been selected by the first user at the first terminal for the group message further comprises:
- determining whether the group message includes a predetermined notification character tagging an alias of each of the plurality of user accounts associated with the users of the chat group;
- grouping user accounts that each have an associated alias in the group message into the first set of user accounts that have been selected by the first user at the first terminal for the group message; and
- grouping user accounts that are not within the first set into the second set of user accounts that have not been selected by the first user at the first terminal for the group message.

9. A server, comprising:
one or more processors; and
memory storing one or more programs to be executed by the one or more processors, the one or more programs comprising instructions for:
- receiving a group message from a first terminal associated with a first user account of the social networking platform, wherein the group message is to be sent to a plurality of user accounts associated with the users of the chat group of which the first user account is a member, each of the plurality of user accounts has elected a disabled status for the group message's notification function;
- dividing the plurality of user accounts into a first set of user accounts that have been selected by the first user at the first terminal as target recipients of the group message and a second set of user accounts that are not members of the first set of user accounts;
- for a respective user account within the first set of user accounts, sending the group message and a notification of the group message to a terminal associated with the respective user account despite of the respective user account's disabled status for the group message notification function, wherein the notification is rendered at the terminal in a first manner configured by the respective user account; and
- for a respective user account within the second set of user accounts, sending the group message and a notification of the group message to a terminal associated with the respective user account consistent with the respective user account's disabled status for the group message notification function, wherein the notification is rendered at the terminal in a second manner configured by the social networking platform, wherein the first manner includes more information related to the group message than the second manner.

10. The server of claim 9, wherein the instruction of, for a respective user account within the second set of user accounts that have not been selected by the first user at the first terminal, sending the group message and a notification of the group message to a terminal associated with the respective user account consistent with the respective user account's disabled status for the group message notification function further comprises further comprises:
- in accordance with a determination that the social networking platform has disabled the feature of sending a group message notification to the respective user account, sending the group message without any notification to the terminal associated with the respective user account.

11. The server of claim 9, wherein the instruction of, for a respective user account within the first set of user accounts, sending the group message and a notification of the group message to a terminal associated with the respective user account despite of the respective user account's disabled status for the group message notification function further comprises:
- sending the group message and the notification to the terminal associated with the respective user account, the notification including the first user account, wherein the notification is rendered at the terminal by displaying the first user account.

12. The server of claim 11, wherein the instruction of sending the group message and the notification to the terminal associated with the respective user account further comprises:
- determining a predetermined privacy setting for the respective user account;
- in accordance with a determination that the predetermined privacy setting indicates heightened notification security, sending a generic notification to the respective user account that does not include content of the group message; and
- in accordance with a determination that the predetermined privacy setting does not indicate heightened notification security, sending a detailed notification to the respective user account that includes content of the group message.

13. The server of claim 11, wherein the instruction of sending the group message and the notification to the terminal associated with the respective user account further comprises:
- determining one or more environmental conditions associated with a device of the respective user account;
- in accordance with a determination that the one or more environmental conditions indicate a heightened privacy risk, sending a generic notification to the respective user account that does not include content of the group message; and
- in accordance with a determination that the one or more environmental conditions do not indicate the heightened privacy risk, sending a detailed notification to the respective user account that includes content of the group message.

14. The server of claim 11, wherein the one or more programs further comprise:
- after sending the notification to the respective user account, obtaining at least one subsequent group message from the group of user accounts in the social networking platform that refers to the user corresponding to the respective user account; and
- in response to obtaining the at least one subsequent group message, sending an updated notification to the respective user account indicating a current count of times that the user has been referred to in group messages sent among the group of user accounts in the social networking platform.

15. The server of claim 11, wherein the one or more programs further comprise:
- after sending the notification to the respective user account, obtaining at least one subsequent group message from the group of user accounts in the social networking platform; and
- in response to obtaining the at least one subsequent group message, sending an updated notification to the respective user account indicating a count of group messages sent by the group of user accounts in the social networking platform since the group message was sent by the first user account that referred to the user corresponding to the respective user account.

16. The server of claim 9, wherein the instruction for dividing the plurality of user accounts into a first set of user accounts that have been selected by the first user at the first terminal for the group message and a second set of user accounts that have not been selected by the first user at the first terminal for the group message further comprises:
- determining whether the group message includes a predetermined notification character tagging an alias of each of the plurality of user accounts associated with the users of the chat group;
- grouping user accounts that each have an associated alias in the group message into the first set of user accounts that have been selected by the first user at the first terminal for the group message; and
- grouping user accounts that are not within the first set into the second set of user accounts that have not been selected by the first user at the first terminal for the group message.

17. A non-transitory computer readable storage medium storing one or more programs, the one or more programs comprising instructions, which, when executed by a server with one or more processors, cause the server to perform operations comprising:
- receiving a group message from a first terminal associated with a first user account of the social networking platform, wherein the group message is to be sent to a plurality of user accounts associated with the users of the chat group of which the first user account is a member, each of the plurality of user accounts has elected a disabled status for the group message's notification function;
- dividing the plurality of user accounts into a first set of user accounts that have been selected by the first user at the first terminal as target recipients of the group message and a second set of user accounts that are not members of the first set of user accounts;
- for a respective user account within the first set of user accounts, sending the group message and a notification of the group message to a terminal associated with the respective user account despite of the respective user account's disabled status for the group message notification function, wherein the notification is rendered at the terminal in a first manner configured by the respective user account; and
- for a respective user account within the second set of user accounts, sending the group message and a notification of the group message to a terminal associated with the respective user account consistent with the respective user account's disabled status for the group message notification function, wherein the notification is rendered at the terminal in a second manner configured by the social networking platform, wherein the first manner includes more information related to the group message than the second manner.

18. The non-transitory computer readable storage medium of claim 17, wherein, for a respective user account within the second set of user accounts that have not been selected by the first user at the first terminal, sending the group message and a notification of the group message to a terminal associated with the respective user account consistent with the respective user account's disabled status for the group message notification function further comprises:
- in accordance with a determination that the social networking platform has disabled the feature of sending a group message notification to the respective user account, sending the group message without any notification to the terminal associated with the respective user account.

19. The non-transitory computer readable storage medium of claim 17, wherein, for a respective user account within the first set of user accounts that have been selected by the first user at the first terminal, sending a notification to a terminal associated with the respective user account further comprises:
- sending the group message and the notification to the terminal associated with the respective user account, the notification including the first user account, wherein the notification is rendered at the terminal by displaying the first user account.

20. The non-transitory computer readable storage medium of claim 19, wherein sending the group message and the notification to the terminal associated with the respective user account further comprises further comprises:
- determining a predetermined privacy setting for the respective user account;
- in accordance with a determination that the predetermined privacy setting indicates heightened notification security, sending a generic notification to the respective user account that does not include content of the group message; and
- in accordance with a determination that the predetermined privacy setting does not indicate heightened notification security, sending a detailed notification to the respective user account that includes content of the group message.

* * * * *